US008782116B2

(12) United States Patent
Nassor et al.

(10) Patent No.: US 8,782,116 B2
(45) Date of Patent: Jul. 15, 2014

(54) METHOD AND DEVICE FOR PROCESSING DIGITAL DATA WITH A UNIQUE IDENTIFIER

(75) Inventors: Eric Nassor, Thorigne Fouillard (FR); Ioana Donescu, Rennes (FR); Fabrice Le Leannec, Noyal-Chatillon sur Seiche (FR)

(73) Assignee: Canon Kabushiki Kaisha, Tokyo (JP)

( * ) Notice: Subject to any disclaimer, the term of this patent is extended or adjusted under 35 U.S.C. 154(b) by 1586 days.

(21) Appl. No.: 10/962,141

(22) Filed: Oct. 8, 2004

(65) Prior Publication Data

US 2005/0114386 A1    May 26, 2005

(30) Foreign Application Priority Data

Oct. 9, 2003    (FR) ...................................... 03 11832

(51) Int. Cl.
*G06F 15/16*       (2006.01)
(52) U.S. Cl.
USPC ........... 709/201; 709/200; 709/202; 709/203; 709/204; 709/205
(58) Field of Classification Search
USPC .................. 709/201, 200, 203, 204, 205, 202
See application file for complete search history.

(56) References Cited

U.S. PATENT DOCUMENTS

| | | | |
|---|---|---|---|
| 6,014,671 A | 1/2000 | Castelli et al. ................. 707/101 |
| 6,199,099 B1 * | 3/2001 | Gershman et al. ............. 709/203 |
| 6,272,662 B1 * | 8/2001 | Jadav et al. .................... 714/805 |
| 6,640,145 B2 * | 10/2003 | Hoffberg et al. ................ 700/83 |
| 6,859,609 B1 * | 2/2005 | Watkins .......................... 386/242 |
| 2001/0027479 A1 * | 10/2001 | Delaney et al. ............... 709/216 |
| 2002/0087728 A1 * | 7/2002 | Deshpande et al. .......... 709/246 |
| 2002/0184318 A1 * | 12/2002 | Pineau ........................... 709/206 |
| 2003/0074403 A1 * | 4/2003 | Harrow et al. ................. 709/203 |
| 2004/0136598 A1 | 7/2004 | Le Leannec et al. ......... 382/232 |
| 2004/0184478 A1 | 9/2004 | Donescu et al. .............. 370/462 |
| 2005/0044146 A1 | 2/2005 | Nassor et al. ................. 709/205 |
| 2005/0044483 A1 | 2/2005 | Maze et al. ................. 715/501.1 |

FOREIGN PATENT DOCUMENTS

| | | |
|---|---|---|
| EP | 1 274 247 | 1/2003 |
| WO | WO 01/84799 | 11/2001 |
| WO | WO 02/08945 | 1/2002 |
| WO | WO 02/15011 | 2/2002 |
| WO | WO 02/15035 | 2/2002 |

OTHER PUBLICATIONS

V. Berk, et al., "File Sharing Protocols: A Tutorial on Gnutella", Institute for Security Technology Studies, Darmouth College, Mar. 2001, pp. i-15.

(Continued)

*Primary Examiner* — Noel Beharry
*Assistant Examiner* — Abdelnabi Musa
(74) *Attorney, Agent, or Firm* — Fitzpatrick, Cella, Harper & Scinto

(57) ABSTRACT

The invention relates to a method of processing digital data constituting a signal in a distributed communication network comprising a plurality of communication apparatuses, the signal being identified by a unique identifier (ID), characterized in that the method comprises the following steps:
  storing one or more parts of the signal, termed exploitable parts of the signal, at one at least given address of a memory location and in a format readable by an application,
  associating the unique identifier of the signal with each exploitable part of the signal,
  storing in at least one communication apparatus a data structure establishing a link between each exploitable part of the signal and the unique identifier of that signal.

39 Claims, 15 Drawing Sheets

(56) References Cited

OTHER PUBLICATIONS

C. Christopoulos, et al., "The JPEG2000 Still Image Coding System: An Overview", IEEE Transactions on Consumer Electronics, vol. 46, No. 4, Nov. 2000, pp. 1103-1127.

R. Prandolini, et al., "JPIP Requirements and Profiles", http://www.dmn.tzi.org/ietf/mmusic/54/id/draft-prandolini-mmusic-jpip-requirements-00.txt>, Apr. 2002.

D. Taubman, "Proposal and Implementation of JPIP (Jpeg2000 Internet Protocol) in Kakadu v3.3", http://www.kakadusoftware.com/jpip-kakadu-superceded.pdf>, Aug. 9, 2002.

* cited by examiner

METHOD AND DEVICE FOR PROCESSING DIGITAL DATA WITH A UNIQUE IDENTIFIER

BACKGROUND OF THE INVENTION

The invention relates to a method and device for processing digital data constituting a signal in a distributed communication network comprising a plurality of communication apparatuses.

In a communication network of distributed type, also known as "peer-to-peer", provision is made to share digital data such as audio files which are, for example, in MP3 format, between a plurality of communication apparatuses connected to the network.

Such communication systems within a distributed network are known, in particular from the international application WO 02/15035 in the name of Napster Inc. entitled "System and method for searching peer-to-peer computer networks".

It should be noted that, in a distributed network such as the Internet, the communication apparatuses connected, which are, for example, computers, may be considered either as being clients and thus receiving data, or as servers and thus supplying data to other apparatuses of the network.

However, in such a network the apparatuses are not necessarily connected in a permanent manner to the network, which means that the requests coming from apparatuses for obtaining data from other apparatuses are processed in asynchronous mode and that all the data are not accessible at all times.

Thus, as a function of the instant at which a client connects itself to the network via a communication apparatus, the client may call upon the source of the data if the source apparatus holding those data is still connected to the network, or else call upon other apparatuses which may have stored those data.

In certain distributed communication networks in which an image signal is transmitted, at the time of a first connection, by a source apparatus possessing that signal, certain of the apparatuses have received what is known as a "thumbnail".

Later, when those apparatuses view the thumbnail and are interested in obtaining supplementary data, it is not easy for the user to search for those missing data.

A peer-to-peer file exchange system is known from the document WO 02/08945 in the name of Digimarc Corporation, which may be centralized like the Napster network described in document WO 01/84799, or distributed like the network Gnutella as described in the document entitled "File sharing protocols: a tutorial on Gnutella" by V. Berk and G. Cybenko, Technical report, Institute for Security Technology Studies, Dartmouth College Hanover, March 2001.

In the document WO 02/08945 mentioned above, the files exchanged are marked with an identifier which makes it possible to control sharing of them, that is to say manage the rights of access, the rights of sharing a file as well as the rights to transfer that file.

A centralized database makes it possible, for each file of which a copy has been supplied to a terminal, to keep information such as the rights communicated with the copy of the file, the possible purchase of the data constituting that file and a possible link to an associated site.

However, such a file exchange system is unsatisfactory in that it does not make it easy to find data of a signal which have been manipulated by the user and stored at a memory location of a client apparatus, possibly in another format.

SUMMARY OF THE INVENTION

To that end, the present invention relates to a method of processing digital data constituting a signal in a distributed communication network comprising a plurality of communication apparatuses, the signal being identified by a unique identifier ID, characterized in that the method comprises the following steps:
storing one or more parts of the signal, termed exploitable parts of the signal, at one at least given address of a memory location and in a format readable by an application,
associating the unique identifier of the signal with each exploitable part of the signal,
storing in at least one communication apparatus a data structure establishing a link between each exploitable part of the signal and the unique identifier of that signal.

In a complementary manner, the present invention also relates to a device for processing digital data constituting a signal in a distributed communication network comprising a plurality of communication apparatuses, the signal being identified by a unique identifier ID, characterized in that the device comprises:
means for storing one or more parts of the signal, termed exploitable parts of the signal, at one at least given address of a memory location and in a format readable by an application,
means for associating the unique identifier of the signal with each exploitable part of the signal,
means for storing in at least one communication apparatus a data structure establishing a link between each exploitable part of the signal and the unique identifier of that signal.

The user may thus select the location in memory where each exploitable part of the signal will be saved, which will enable him to use that part with other tools if he so wishes.

By linking one or more exploitable parts of the signal by means of a unique identifier, and by storing a data structure in one or more communication apparatuses of the network which make it possible to establish that link between each exploitable part of the signal and that identifier, it is easy to retrieve, on the basis of one exploitable part of the signal, one or more other exploitable parts linked thereto. The part of parts sought may be found in the apparatus in which the data structure is stored, or even in a remote apparatus.

The use of that link makes it possible easily to determine the data available on an apparatus, or even on the network, and those which are missing.

On the contrary, in the prior art, once a user has, at a client apparatus, manipulated a digital signal which it has received, or a part of it, it is then no longer possible for other apparatuses of the network to find it. That signal or that part of that signal is thus no longer exploitable for the network.

It will be noted that an exploitable part of the signal is considered by the user as a: "coherent" part of the signal. This means that the data which constitute the part of the signal are directly usable by a user and thus have a signification per se, for example a "thumbnail" for an image signal.

According to one feature, the data structure takes the form of a location table for all the exploitable parts of the signal having the same unique identifier of the signal.

This enables rapid access to the list of the exploitable parts of the signal when its identifier, which is the search key, is known.

According to one feature, the data structure establishes a link between the unique identifier of the signal and the addresses in memory of the different exploitable parts of the signal.

This makes it possible to rapidly obtain, on the basis of an identifier, the list of the parts locally available.

According to one feature, the data structure also establishes a link between each exploitable part of the signal and an index representing the data present in the part considered.

This feature makes it possible to choose the part of the signal that is the best adapted to what the user seeks or to what a network request asks for without needing to analyze the content of each part.

According to one feature, for each exploitable part of the signal, the index describes sub-parts of data constituting the part considered.

When a data sub-part is sought, this feature makes it possible to rapidly obtain a part which contains that sub-part.

According to one feature, the data structure establishes a link between the unique identifier of the signal and the addresses in memory of the indices of the different exploitable parts of the signal.

This feature makes it possible to access the index of each part of the signal more rapidly on the basis of the identifier of the image. The addition and the deletion of a part are also facilitated with respect to a solution in which the indices of the parts are stored in a single table.

According to one feature, each index specific to a given exploitable part of the signal corresponds to a data structure in table form comprising the identification of the data present in the part considered and their addresses in memory enabling them to be retrieved in said part stored in memory.

This feature makes it possible to rapidly access the sub-part sought in the part, without having to analyze the structure of that part.

According to one feature, the method comprises the following steps performed by the communication apparatus or apparatuses in which one or more exploitable parts of the signal are stored:

prior reception of at least some data constituting the signal, managing locations in memory adapted to the fact that the data received which are not contained in the part or parts of the signal stored respectively in one or more memory locations are stored in memory in a memory location distinct from them, while the data received which are contained in the part or parts of the signal stored in memory are not stored in memory in the distinct memory location.

Thus, duplication of the same data in two different memory locations is avoided, which makes it possible to optimize the management of the memory resources of the apparatus or apparatuses.

According to one feature, the method comprises a step of selecting at least one format in which each exploitable part of the signal is stored.

The user may thus choose the format that is the best adapted according to the tools he wishes to use to view or edit the part of the signal when it is an image signal.

According to one feature, the method comprises a step of transferring over the network sub-parts of data constituting at least one exploitable part of the signal.

According to one feature, the step of associating the unique identifier of the signal with an exploitable part of the signal is performed by the communication apparatus or apparatuses receiving all or part of the data constituting that part.

The exploitable part of the signal may be received from the network by the receiving apparatus and marked locally.

Furthermore, the exploitable part may be created on the receiving apparatus from sub-parts received and contained or not contained in other local parts.

According to one feature, the step of associating the unique identifier of the signal corresponds to a step of inserting that identifier in an exploitable part of the signal.

Thus the identifier of the shared image can easily be found from the exploitable part of the signal.

The solution is more effective than a possible variant consisting of calculating a signature of the part and of accessing a table associating the signature of the part with the identifier of the signal.

According to one feature, the step of storing the data structure in memory is performed by the communication apparatus or apparatuses receiving all or part of the data constituting an exploitable part of the signal.

The communication apparatus can thus utilize the data structure to search for the parts that are local even if its connection with the network is interrupted.

According to one feature, the method comprises a step of obtaining, by at least one communication apparatus receiving all or part of the data constituting an exploitable part of the signal, at least one data descriptor representing the data present on one or more other communication apparatuses of the network.

This feature enables the communication apparatus rapidly know who to send a request to when it seeks certain data.

According to one feature, the method comprises a step, performed on a communication apparatus on which one or more exploitable parts of the signal are stored, of viewing all or part of each exploitable part of the stored signal.

The user may thus manipulate any stored exploitable part like any other conventional file.

According to one feature, the method comprises a step, performed on a communication apparatus on which one or more exploitable parts of the signal are stored, of viewing information specific to each stored part and adapted to inform a user of the state of the part considered.

The user may thus be informed in a simple manner of the state of each of the parts of the signal which are stored in memory.

According to one feature, the state of the exploitable signal part considered represents the availability of other data constituting the signal.

The user thus knows in a simple manner whether he can access other parts of the signal apart from the one he is currently viewing.

According to one feature, the state of the exploitable signal part considered represents the possibility of sharing that part with one or more other communication apparatuses.

The user thus easily knows whether the image he is viewing may be served to other users.

According to one feature, the information specific to each part stored in memory is in particular obtained from the data structure stored in memory.

The information is thus rapidly available and may thus be displayed very rapidly, which is indispensable if it is desired to be able to display them for several signal parts simultaneously.

According to one feature, the method comprises a step, performed on a communication apparatus on which one or more exploitable parts of the signal are stored, of viewing commands enabling a user, on the basis of an exploitable part of the signal stored in memory, to perform different operations specific to the sharing of the part considered with one or more other communication apparatuses, i.e. in particular, to complete the part considered with supplementary data and/or to share the part considered with one or more other communication apparatuses.

The use of these commands thus enables the user to manipulate a part in a very simple and rapid manner.

According to one feature, the method comprises a prior step of generating the unique identifier of the signal.

The unique identifier of the signal is then used both for easily finding the signal on the network and on a machine for rapidly finding all the exploitable parts of that signal.

According to one feature, the step of generating the unique identifier of the signal is performed by the communication apparatus transferring all or part of the data constituting an exploitable part of the signal to one or more other communication apparatuses.

The same identifier is thus used by all the apparatuses of the network, which simplifies the searches.

According to one feature, the digital signal is an image signal.

The invention also concerns a communication apparatus comprising a device as briefly disclosed above.

According to another aspect, the invention also relates to:
 an information storage means which can be read by a computer or a microprocessor containing code instructions of a computer program for executing the steps of the method according to the invention as for the one briefly disclosed above, and
 a partially or totally removable information storage means which can be read by a computer or a microprocessor containing code instructions of a computer program for executing the steps of the method according to the invention as for the one briefly disclosed above.

According to yet another aspect, the invention relates to a computer program which can be loaded into a programmable apparatus, containing sequences of instructions or portions of software code for implementing steps of the method according to the invention as briefly disclosed above, when said computer program is loaded and executed on the programmable apparatus.

As the features and advantages relating to the device according to the invention, to the communication apparatus comprising such a device, to the information storage means and to the computer program are the same as those set out above concerning the method according to the invention, they will not be repeated here.

Other features and advantages of the present invention will emerge more clearly from a reading of the following description, given with reference to the accompanying drawings.

DETAILED DESCRIPTION

Figure 1:
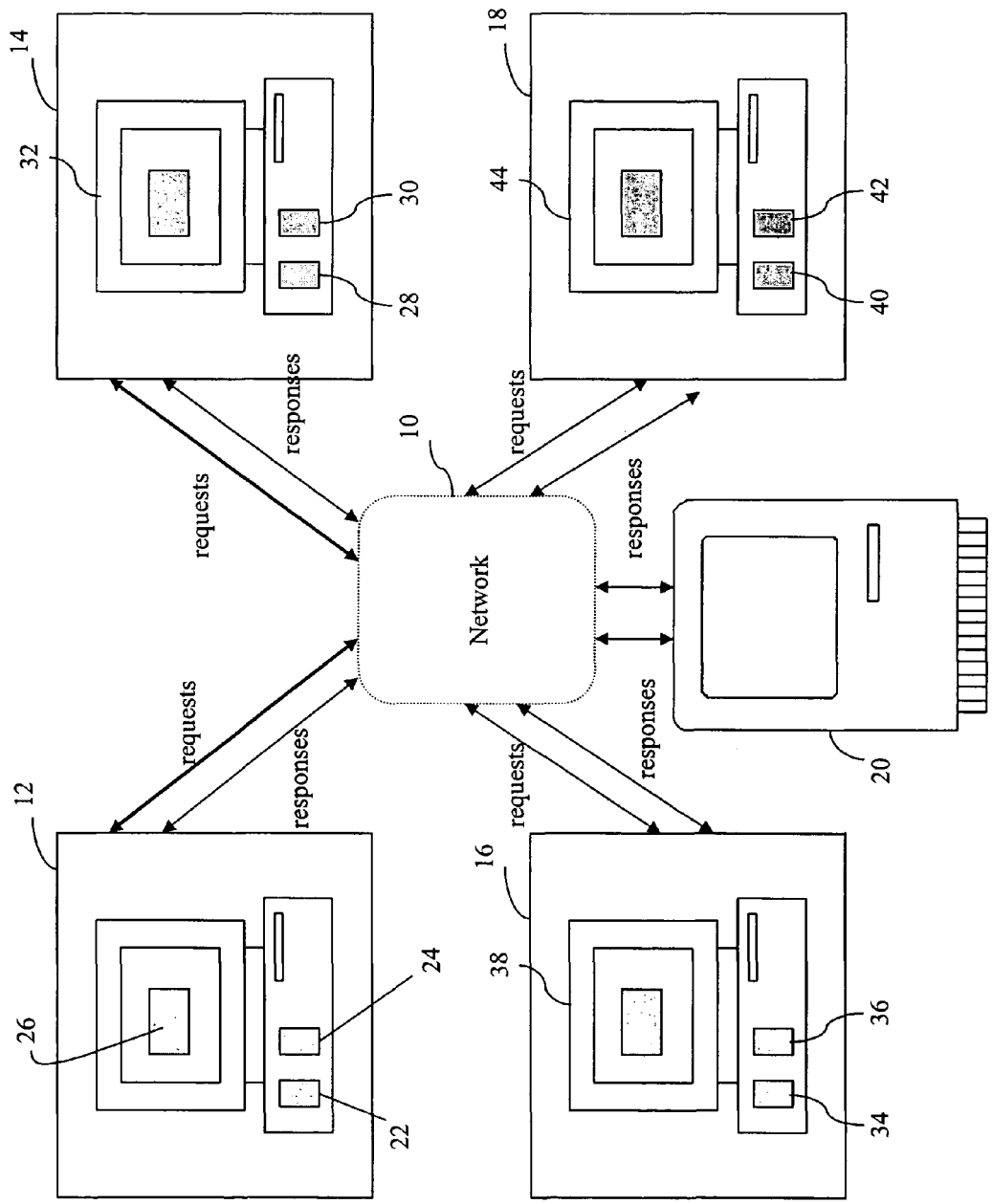
FIG. 1 is a diagram of a communication network of distributed type.

As represented in FIG. 1 and designated by the general reference numeral 10, a communication network of distributed type such as the Internet links a plurality of communication apparatuses 12, 14, 16, and 18 together as well as possibly a communication apparatus 20 which fulfills the role of a central server.

The latter is always connected to the network 10 and stores a set of data based on the exchanges which take place between the communication apparatuses in the form of requests and responses.

It should be noted that the term peer-to-peer exchanges is used in this context.

The set of data stored on the central server 20 contains, for example, information on the presence of each of the communication apparatuses identified as forming part of the network, information on the contents which are stored locally in each communication apparatus, etc.

It is also possible that the central server has certain data which may be found elsewhere in one or more communication apparatuses connected to the network.

The communication apparatuses connected to the network have known communication means.

Each of the communication apparatuses may for example take the form of the apparatus represented in FIG. 15 of which the description will be given later.

It will be noted that each communication apparatus may either comprise a device according to the invention or correspond to a device according to the invention.

The communication apparatus 12 comprises a volatile memory (cache memory) 22, a file server 24 and a user interface 26 enabling the user to formulate requests which will be transmitted via the network 10 to other communication apparatuses.

According to the invention, the communication apparatuses 12 to 18 communicate directly with each other via the data exchange network 10.

Nevertheless, according to a variant form of the invention, the central server 20 may also participate in the communication between the different communication apparatuses 12 to 18.

The communication apparatuses 14, 16 and 18 also comprise a volatile memory, a file server and a user interface which are respectively referenced 28, 30 and 32 for the apparatus 14, 34, 36 and 38 for the apparatus 16 and 40, 42 and 44 for the apparatus 18.

It will be noted that the invention applies to the transmission of multimedia data via the distributed communication network 10 represented in FIG. 1.

In the example embodiment the multimedia data concerned make up an image signal having several levels of resolution (multi-resolution format), that is to say that several spatial resolutions of the same image are contained in the same file.

The data may be compressed or not without this affecting the principle of the invention.

More particularly, the compression format used in particular in the description which follows is that used in the JPEG2000 standard but other multi-resolution formats may of course be envisaged.

Generally, the invention also applies to the transmission of multimedia data within the network of FIG. 1, in which the data may make up a video signal or another possibility is an audio signal.

Figure 2:
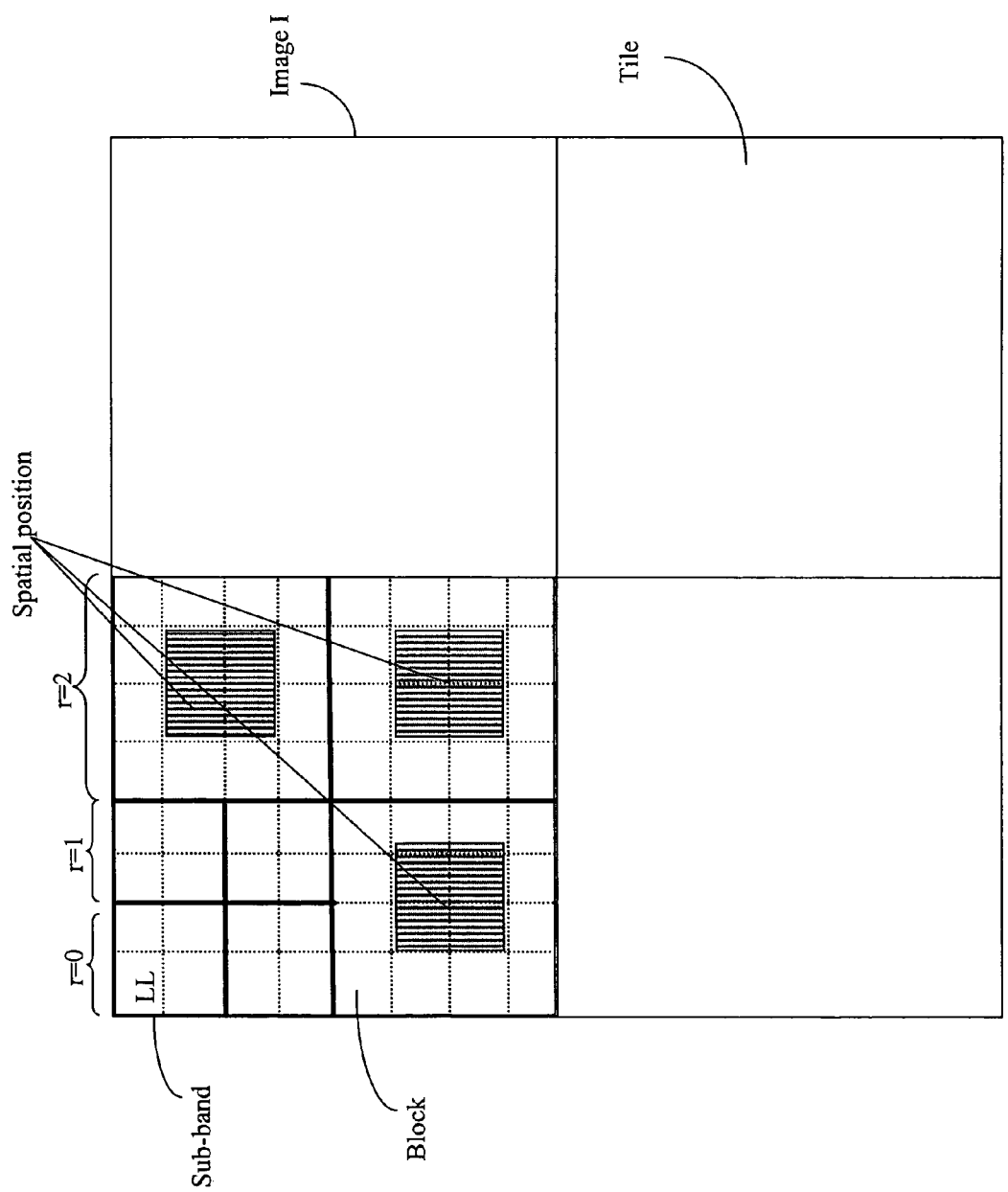
FIG. 2 shows the representation of an image decomposed into frequency sub-bands and partitioned into four tiles.

As shown diagrammatically in FIG. 2, an image I is partitioned spatially, following the JPEG2000 standard, into zones called tiles which are each processed independently for the operation of the compression of the data.

The image of FIG. 2 is partitioned into four tiles which are each decomposed into spatio-frequential frequency sub-bands, but only the tile situated at the upper left of the image illustrates this decomposition.

Such a decomposition into several levels of resolution (r=0, 1 and 2) results, for example, from a discrete wavelet transformation and is well-known to the person skilled in the art.

Also in known manner, the frequency sub-bands of the same size in the representation given in FIG. 2 all correspond to the same resolution level for different spatio-frequential orientations.

The operation of compressing the data of the image is based on the division of the frequency sub-bands into smaller data units, called code-blocks, which are blocks of data.

These code-blocks are rectangular subsets of coefficients resulting from the transformation into frequency sub-bands which are defined within each sub-band.

When the compressed bitstream is formed, it is possible to re-group the code-blocks of the frequency sub-bands which correspond to the same spatial location or precinct within the same resolution level.

Figure 3:
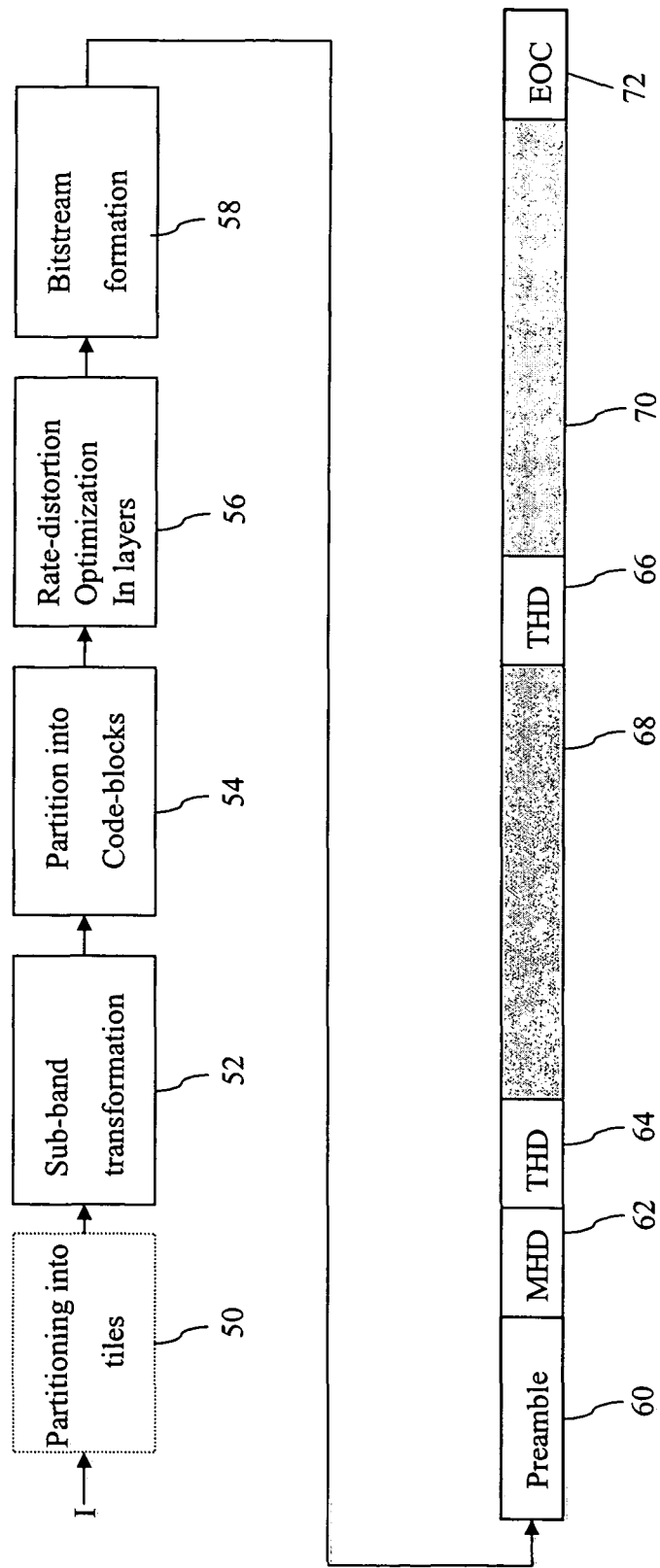
FIG. 3 is a diagram of the formation of a compressed bitstream conforming to the JPEG2000 standard.

FIG. 3 illustrates very diagrammatically the formation of a bitstream compressed in accordance with the JPEG2000 standard.

An initial image I first of all undergoes an optional operation of spatial partitioning into image zones or tiles 50, then an operation 52 of spatio-frequential transformation into frequency sub-bands (for example, by a discrete wavelet transformation).

Further to the transformation operation 52, coefficients representing each tile in the spatio-frequential domain are obtained and which are next partitioned, during an operation 54, into code-blocks as illustrated by FIG. 2.

A following operation 56 provides for the application to the image of an algorithm for rate-distortion optimization for each quality layer of each code-block, which makes it possible to obtain the best contribution of each code-block in terms of rate, at each quality layer.

The final operation 58 consists in forming the bitstream of the image in accordance with the description syntax provided in the JPEG2000 standard, as described in the document "JPEG2000 image coding system ISO/IEC 15 444-1. 2000".

As shown in FIG. 3, the bitstream of the compressed image signal conforming to the JPEG2000 standard comprises first of all an optional preamble 60 containing metadata, such as the image identifier, the author of the image, etc., and a set of compressed data known as the codestream comprising main header data (MHD) 62 and at least one tile.

In FIG. 3 two tiles have been shown. Each tile is composed of tile header data 64 and 66 and a set of compressed image data 68 and 70 known as a tile-part bitstream.

Each tile-part bitstream comprises a sequence of data packets each containing a packet header and a packet body.

The body of each packet comprises the code-blocks mentioned above which are each compressed in a plurality of incremental quality levels or layers: a basic layer and refinement layers.

It will be noted that the header of each packet contains both the list of the code-blocks contained in the packet under consideration, as well as the compression parameters relating to each code-block.

Each level or layer of quality of a code-block is contained in a distinct packet.

Thus, a data packet contains a set of code-blocks corresponding to a given tile, component, resolution level, quality level and precinct.

In the context of the embodiment of the invention presented here and applied to the signals of images conforming to the JPEG2000 standard, the minimum data transmitted between the communication apparatuses of FIG. 1 over the distributed network are the data packets described above.

Figure 4:
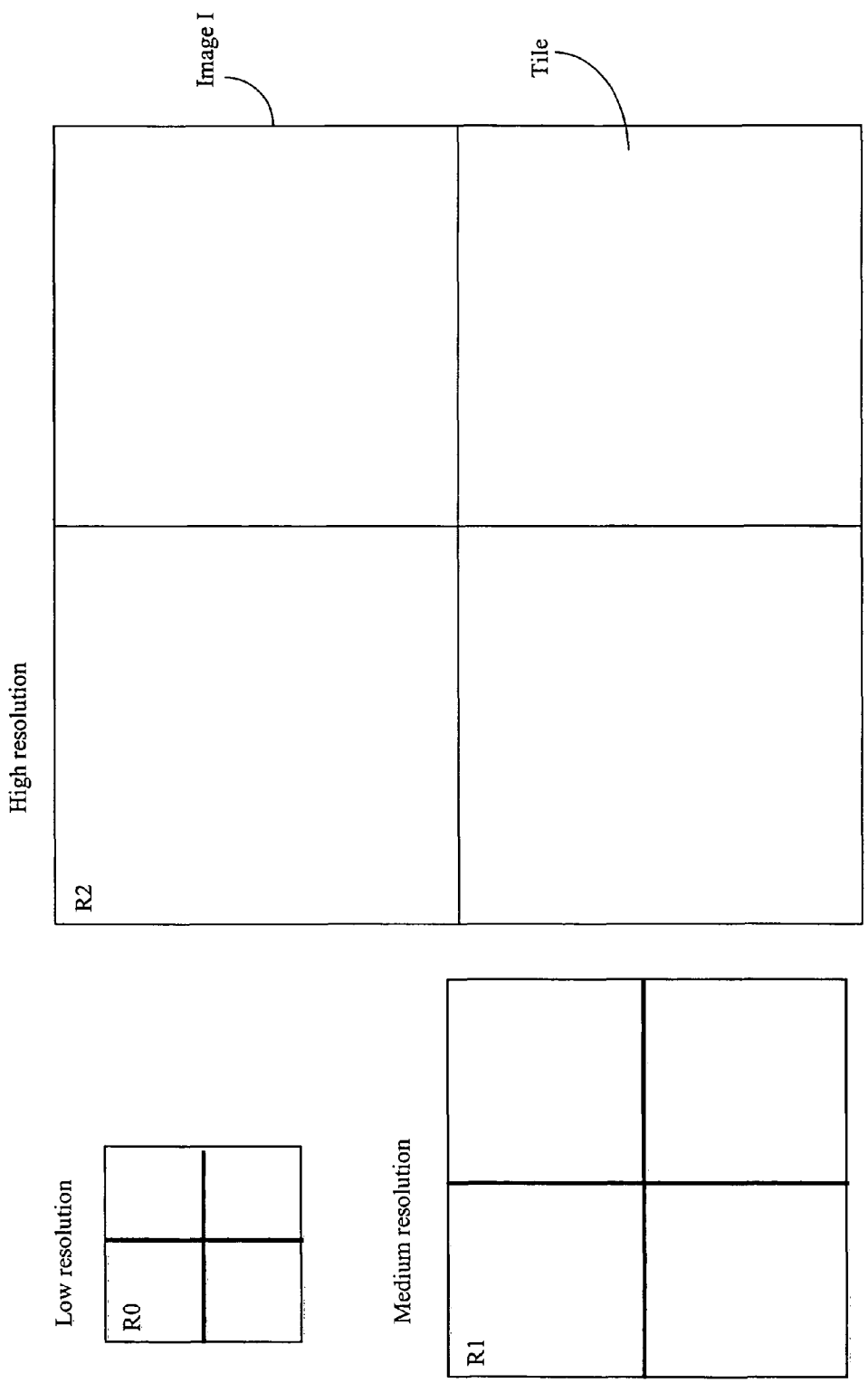
FIG. 4 illustrates the JPEG image format.

FIG. 4 illustrates the possible use of an image format different from the JPEG2000 format presented above. In JPEG format, an image I may be spatially cut up into tiles. Each tile is compressed independently and can thus be accessed in isolation.

The same image may be compressed at several resolution levels (low, medium and high resolutions) and thus form several independent JPEG images. The basic unit which can be decoded is in this case a data packet in JPEG format corresponding to a resolution level, a file, and a component.

To store the different resolutions, it is possible to use several JPEG files or a file format such as "FlashPix" (proprietary format of the Kodak company) which stores several resolutions in the same file. Although these solutions are less efficient than with the JPEG2000 format (the space used is approximately 33% greater), they are nevertheless of interest due to JPEG format being more widespread. Indeed, with the latter format, the views which may be used to store data in addition to the cache file (cache memory) may be in JPEG format, the cache file itself containing a set of packets in JPEG format.

Figure 5:
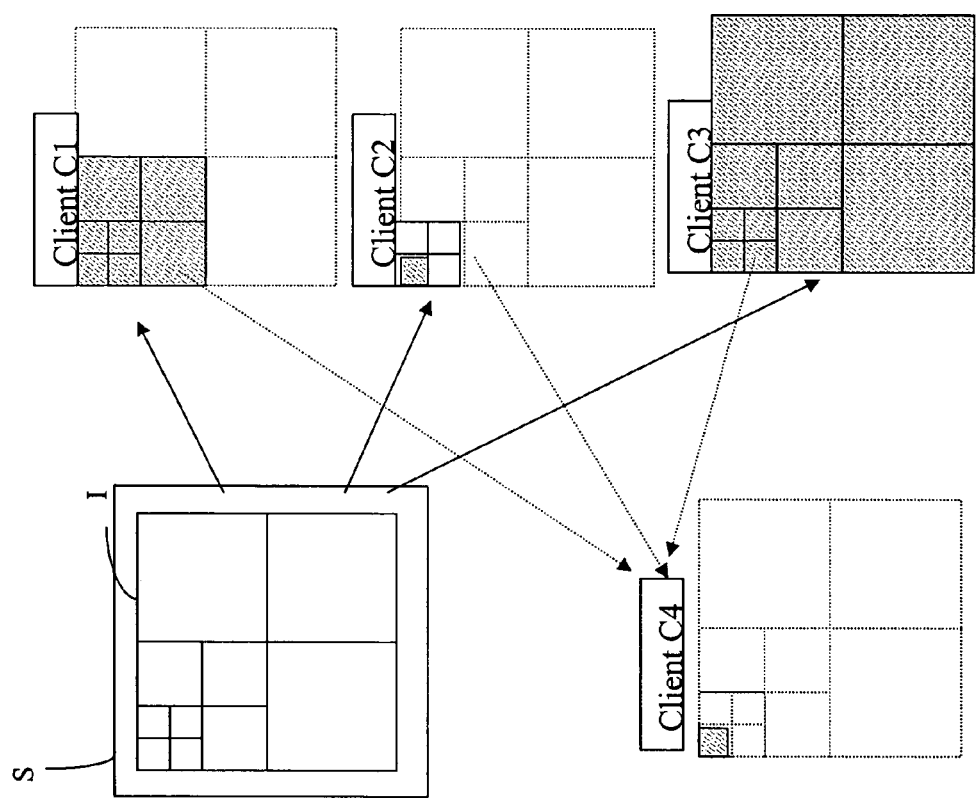
FIG. 5 illustrates the sharing of an image signal on a distributed network according to the invention.

FIG. 5 which follows illustrates the transmission of data making up an image signal with several resolution levels between several communication apparatuses including a so-called source apparatus, denoted S, on which is stored an image signal I, and several communication apparatuses referred to as client apparatuses and denoted C1, C2, C3 and C4.

Figure 15:
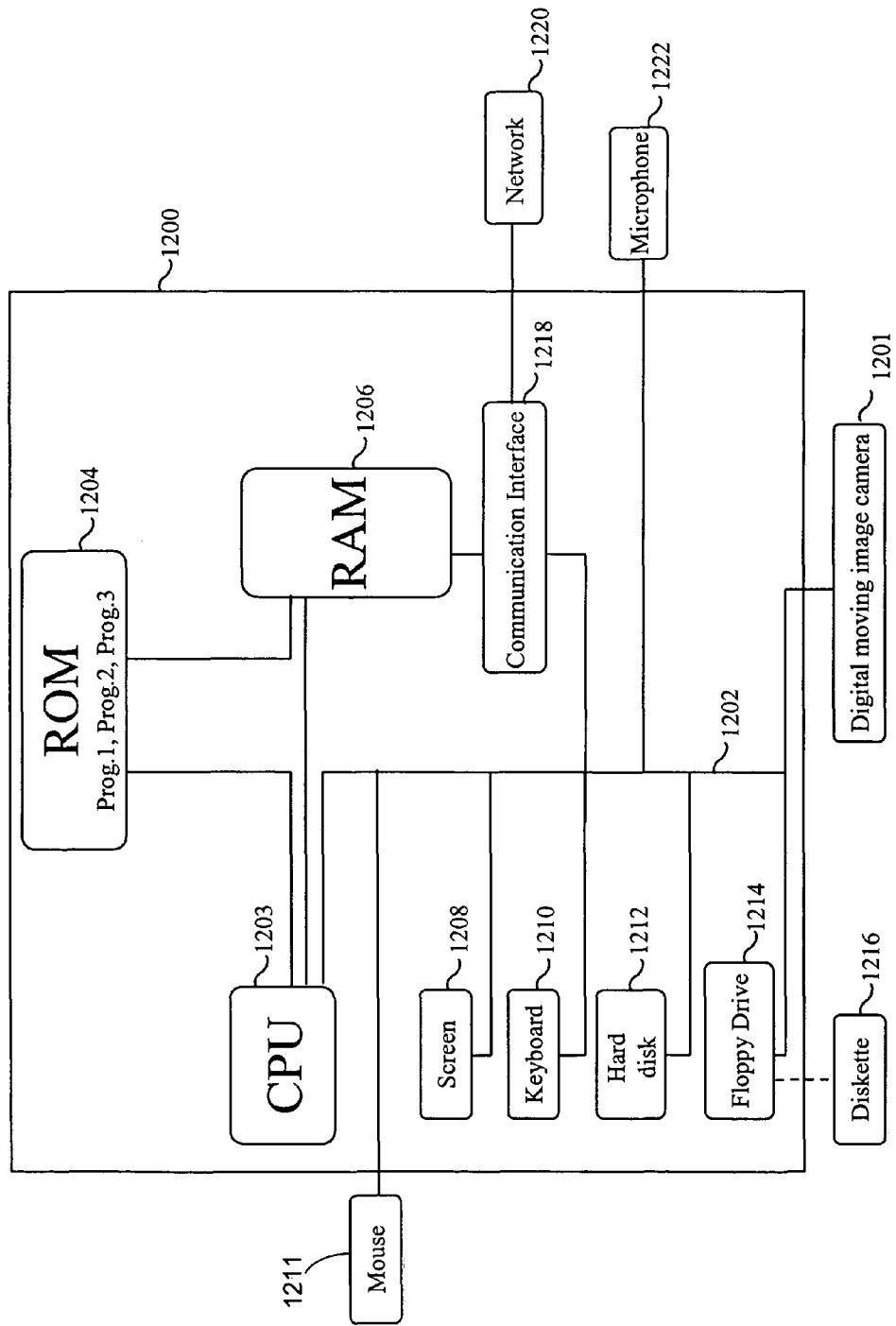
FIG. 15 is a diagram of a programmable apparatus implementing the invention.

These communication apparatuses have the structure of those represented in FIGS. 1 and 15 and each comprises a device according to the invention.

This Figure thus illustrates the exchanges of data in the case of sharing a multi-resolution image signal in a distributed network.

It will be noted that the image I is that which was described with reference to FIG. 2 and which thus has three resolution levels.

In the example embodiment described it is considered that, when all the apparatuses C1, C2, C3 and C4 are connected to the source apparatus S via the distributed network, they all receive from the latter an exploitable part of the image signal I which corresponds to the low frequency sub-band of that signal, thus constituting the minimum of information shared by all the communication apparatuses.

Such a part of a signal is an example of a signal part qualified as an exploitable part of the signal, which means that the data which constitutes that part have a signification per se which enables them to be exploited by a user. Thus, for an image signal, an exploitable part of that signal is a part of the signal that the user can view and, for an audio signal, it is a part of the signal that the user can listen to.

It will be noted that an exploitable part of the signal is a part of the signal which is saved in a format that can be read by an application.

The apparatuses C1, C2, C3 and C4 are also referred to as recipient apparatuses.

The part of the signal of very low resolution referred to above is called a "thumbnail".

Each of the client or recipient communication apparatuses C1, C2, C3 and C4 may view the part of the image signal thus received and then take a decision as to whether supplementary data (other parts of the image signal) are necessary for the apparatus concerned.

More particularly, each apparatus has the possibility of increasing the resolution of the part of the image signal already received, for example, by requiring the high frequency sub-bands of each resolution level and/or by requesting more details concerning the part of the image signal received.

Furthermore, the user may extract a spatial zone of the image signal at a given resolution and/or quality level.

It should be noted that the image signal I does not necessarily have a multi-resolution format and the part of the signal received by the apparatuses C1 to C4 may, for example, correspond to a spatial zone of the image.

Later on one or more apparatuses may thus wish to receive another spatial zone of the image or else to receive more in relation to the first zone received.

In FIG. 5, cross-hatched zones at each of the recipient or client apparatuses C1, C2, C3 and C4 have been used to represent the data of the signal of image I which are present locally in the apparatus concerned.

The data constituting coherent parts of the image signal I and which are locally present on the apparatuses C1 to C4 may be stored in one or more local files.

Thus, the representation in FIG. 5 assumes that each of the client or recipient apparatuses has received the above-mentioned thumbnail from the source apparatus and has then taken a decision based on that thumbnail to send out a request to the source apparatus S for obtaining supplementary data.

However, in the example considered, the recipient client C4 did not send a request to obtain supplementary data when the sharing of the image signal was carried out by the source apparatus S and it has only received the thumbnail.

Furthermore, in the case in which the apparatus C4 was not connected at the moment when the source apparatus transmitted the thumbnail to all the recipient apparatuses which were connected, the apparatus C4 may, later, retrieve this thumbnail from the apparatus 20 of FIG. 1 which is permanently connected and which acts as central server.

In the example illustrated, the recipient apparatus C1 has received two complete resolution levels out of three of the resolution levels of the image signal, whereas the recipient apparatus C2 has only received the first resolution level.

On the other hand, recipient apparatus C3 has received the entire image signal.

When apparatus C4 is connected, then the source apparatus S is disconnected and apparatus C4 must therefore resort to the recipient apparatuses C1, C2 or C3 to retrieve the supplementary data which it is missing with respect to the data making up the part of the signal which it has already received, in order to complete the viewing of the shared image.

To do this, the recipient apparatus C4 requires information on the shared image signal I as well as on the parts of the signal present locally on the recipient communication apparatuses C1, C2 and C3 which constitute potential servers.

Provision is thus made to make use of a descriptor of the shared image and of a descriptor of local data which describes, in relation to each communication apparatus C1, C2, C3, the data which are locally present on that apparatus.

Furthermore, the local descriptor may also provide the position or address, in a local memory of the apparatus concerned, of the data which are present locally on that apparatus. The local descriptor corresponds to the table described with reference to FIG. 8.

The construction of the descriptor of the shared image on the basis of the local descriptor will be described with reference to FIG. 10. The descriptor of the shared image describes the set of data locally present on the client apparatus.

It will be noted that, according to a particular approach, the invention makes provision in the source apparatus S for having a shared image signal descriptor which represents the local presence on that apparatus of all the data making up the image signal.

The shared image signal descriptor present on the source apparatus S is transmitted to the different communication apparatuses C1, C2, C3 and C4 during the transmission of the thumbnail or else solely to the apparatuses C1, C2 and C3 when they require supplementary data in addition to the thumbnail already received.

Each recipient apparatus receiving the shared image signal descriptor from the source apparatus creates another data descriptor, called the local descriptor, which it updates such that the latter is representative of the local presence of all or part of the data making up the signal which have been received by that apparatus.

Table 930 corresponding to the index file of the cache serves as local descriptor.

Figure 6:
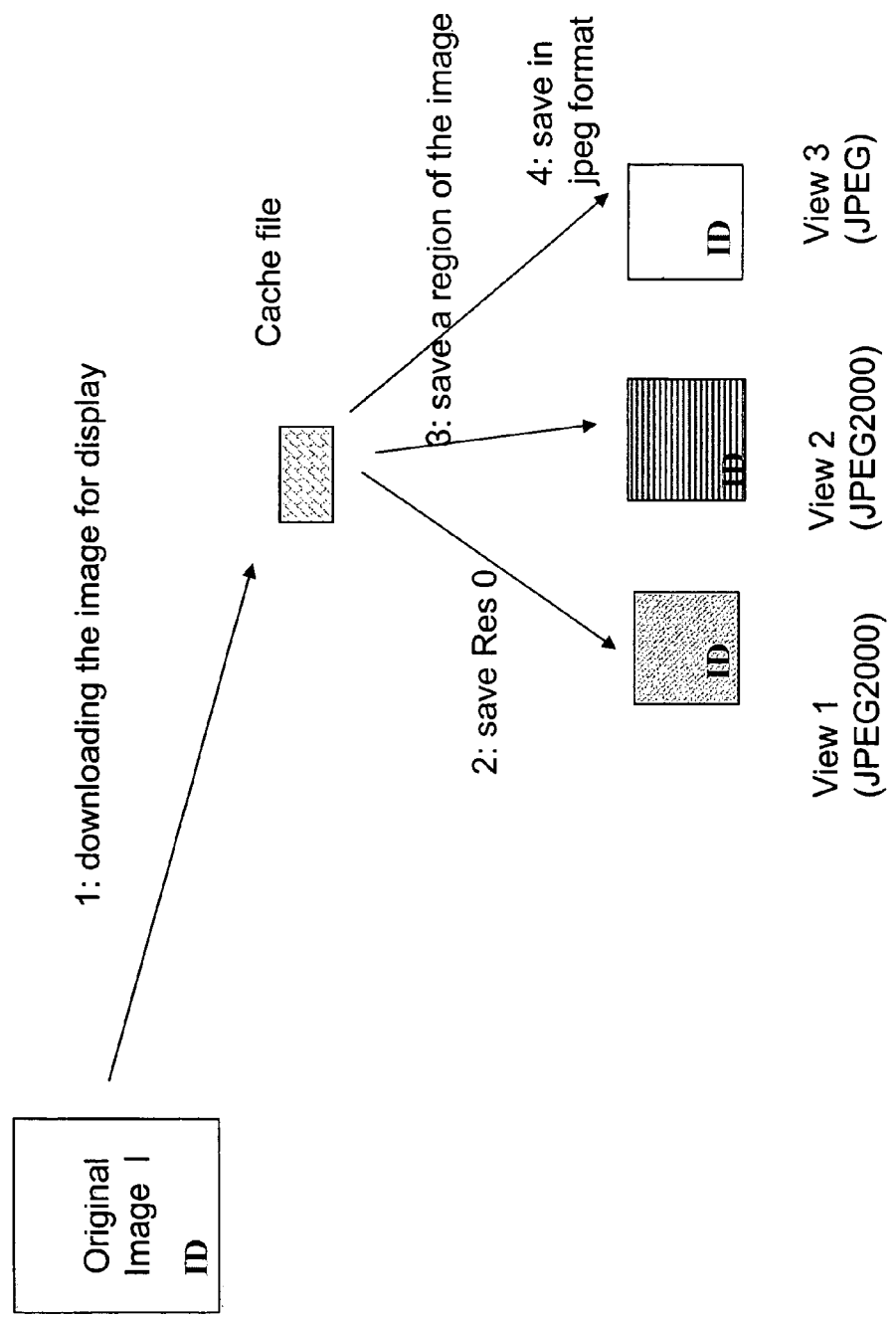
FIG. 6 illustrates the storage in memory of several views received by a client apparatus.

FIG. 6 is a diagram of the saving, at the step denoted 1, of the data received by a client apparatus and coming from a server apparatus. During the advancement of the interactive consultation phase described with reference to FIG. 5, the user may at any time store in memory the data of the image signal downloaded.

As shown in FIG. 6, all the data received are first of all stored in a memory location, for example, of a hard disk of the apparatus in a file called cache file.

The user may then save the data in a known format such as JPEG or JPEG2000 in one or more memory locations distinct from that of the cache file. The image saved is an exploitable part (also qualified as a coherent part) of the original image corresponding to a set of tiles and to a resolution for the JPEG format, or to a precinct, a resolution and a quality for the JPEG2000 format.

It should be noted that the user may select a format in which a part of the image will be stored.

The exploitable part of the signal which has been stored is termed a "view" on the original image. A particular case is that in which the view is complete in that it contains the entirety of the data of the original image.

As represented in FIG. 6, at step 2, the user saves a low resolution (Res 0) of the image in a first file in JPEG2000 format which is called view1. He then saves, at step 3, a precinct of the image with the maximum resolution in a second JPEG2000 file (view2). At step 4, he creates a third view in a file in JPEG format (view3).

Each view thus formed is saved at a location in memory chosen by the user in order to be used by any software application possessed by the user depending on the format chosen for the view.

It will be noted that the data previously stored in the cache file and which are contained in at least one of the views created are deleted from the cache file in order to reduce the size of the latter and thus optimize the management of the memory resources of the apparatus.

The data may be deleted to the extent that they are stored in the same format in the cache file and in a view.

However, if the data are stored in two distinct memory locations and in two different formats, it is nevertheless possible to delete the data from the cache file to the extent that it is possible to pass from one format to the other without loss of information.

Each image shared on the distributed network is identified uniquely by an identifier. That identifier may be obtained, for example, by determining a signature on the initial image (for example a signature of MD5 type) or by generating a random value having a high probability of being unique. The generation of such a random value is performed in accordance with conventional techniques known to the person skilled in the art, the example, by using the function "CoCreateGuid" under Windows.

According to the invention, with each view or exploitable part of the signal there is associated the identifier ID of the original image I, even if the view only contains a part of the image I. That identifier may be inserted in a header of the image format chosen by the user or in a watermark of the image which may be produced, for example, by a robust watermarking method known to the person skilled in the art.

That identifier enables any application knowing the image exchange system to establish a link between the view stored in memory and the shared image and thus to provide specific functions linked to the image exchange. Several functions will be described later with reference to FIG. 14. One of the main functions is to enable the user, starting with the view stored in memory, to get back to the original image and thus to be able also to view the spatial zones of the image and the resolutions which are not found in the view but in the cache memory or in other views. The user may even access the data available on other apparatuses of the distributed network.

It may be envisaged for the generation of the identifier to be performed on a server apparatus, while the association is made on the client apparatus.

It may also be envisaged for those steps of generation and association to be performed on a server apparatus which transmits those signal parts to a client apparatus.

However, in the case in which certain views are in the same format as the format of the packets exchanged, it is possible to reduce the size of the cache file by deleting the packets which can be found in the views as described below with reference to FIG. 7.

Figure 7:
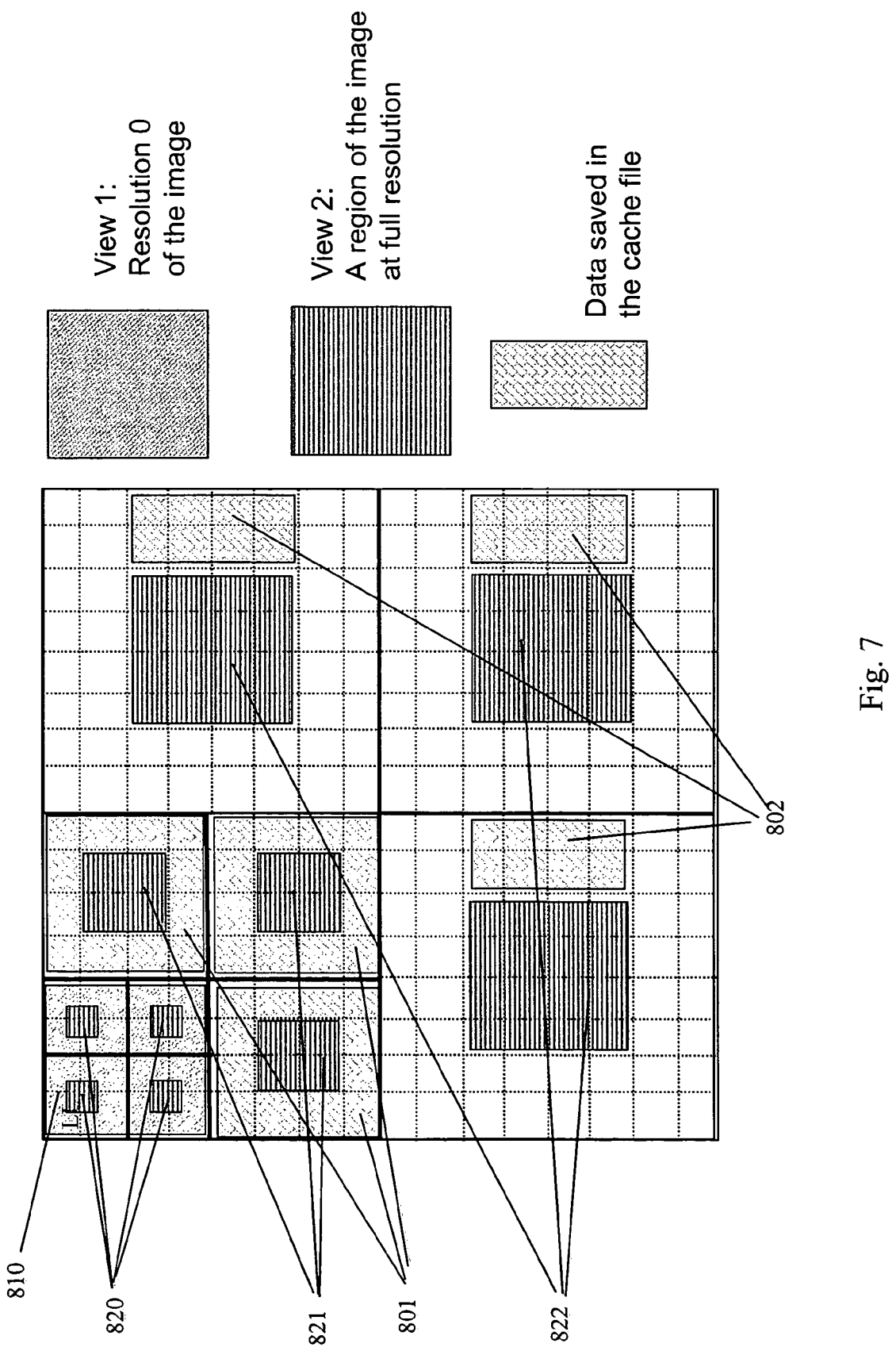
FIG. 7 illustrates the distribution, in an image signal decomposed into sub-bands, of the different data received and stored in memory by a client apparatus.

FIG. 7 illustrates the distribution, in the image signal decomposed into sub-bands, of the image data received and stored in memory, according to the example of FIG. 6 and using the JPEG2000 format as image exchange format.

View 1 corresponds to the low resolution of the image of which the set of code-blocks LL (zone 810) is saved in the corresponding file. If one of those blocks must be provided to a client of the network, it may be retrieved from the file of view 1 since it is in JPEG2000 format. It is however necessary to have a data structure such as that represented in FIG. 8 since the block numberings are not necessarily the same in view 1 and in the original image.

View 2 corresponds to a precinct of the image at the maximum resolution and the code-blocks corresponding to that zone are distributed in all the resolutions of the image (820, 821, 822).

In the example provided, the user has viewed the entirety of resolution 1 (zone 801) and a part of resolution 2 (zone 802).

Solely the blocks which are not already stored in a file containing a view need to be saved in the cache file.

If a new view is created subsequently, it is then possible to delete the blocks saved in that view from the cache file.

In an extreme case in which a view contains the entirety of the image data, the cache file may be deleted.

In the example of FIG. 6, a third view in JPEG format is saved. However, as the exchange format used in the example is JPEG2000, the data of view 3 are not usable to recreate the information of the cache file and no code-block can thus be deleted.

Similarly, it is possible to save a view on a removable medium such as a CD engraver or a diskette, but in this case it is appropriate not to delete the data from the cache file.

In the case in which the JPEG format is used as exchange format, solely the views in JPEG format can be used to save data of the cache file. The principle is however the same as for the JPEG2000 format: the data corresponding to a resolution or to a tile may be deleted from the cache file if they are present in a view.

If desired, it is also possible to delete the information corresponding to a resolution if the entire resolution above is already present: the low resolution can indeed be recalculated from the highest resolution.

As the views contain data which are utilized to reconstruct the complete image and the file containing those views are accessible to the user, it is necessary to protect them or at least to verify their integrity. This is because, whether deliberately or not, the user may modify the content of the image and invalidate all the data of a coherent part of the image signal contained therein.

It is thus necessary to attempt to protect or warn the user that the file must not be modified.

This may be achieved by putting the file into "read only" mode using the functions of the operating system of the computer system.

A user with bad intentions may however get round these protections.

It is thus proposed to add a signature making it possible to verify the integrity of the data contained in the view.

This may be achieved by techniques known to the person skilled in the art such as those consisting of obtaining an MD5 signature on the basis of the entirety of the data contained in the image.

That signature may advantageously only be obtained on the basis of the data part of the image and the user may thus modify the headers of the image (to add, for example, metadata as keywords) without rendering the file unusable.

A possible alternative is to apply a fragile watermark to the data of the image. The advantage of this alternative is to be able to detect a possible modification of the data after the fragile watermarking has been inserted, without having to store a supplementary item of information such as the signature. The verification of the fragile watermarking makes it possible to detect, or even locate, the modifications which have affected the coefficients representing the image, whether the storage mode be in JPEG or JPEG2000 format. In particular, use could be made of the methods proposed in the patent application FR 99 13836 in the name of Canon Kabushiki Kaisha, the title of which is "Method of inserting a secret mark and authenticating a digital signal", for the JPEG format and in the application FR 00 13989 in the same name, entitled "insertion of supplementary information in digital data", for the JPEG2000 format.

Another particular case is that of the original image which may be considered as a particular view and marked with the unique identifier of the image as a normal view. This makes it possible to avoid regenerating another identifier if the image is shared again.

Moreover, as for a view, a link is kept between the original image and the shared data (to display a state, for example), this makes it possible, when data must be found again, to retrieve them by directly using the original image.

As mentioned above, the set of data constituting an image signal may be distributed between a plurality of files each containing one or more exploitable parts of the signal: the cache file and the view files.

Figure 8:
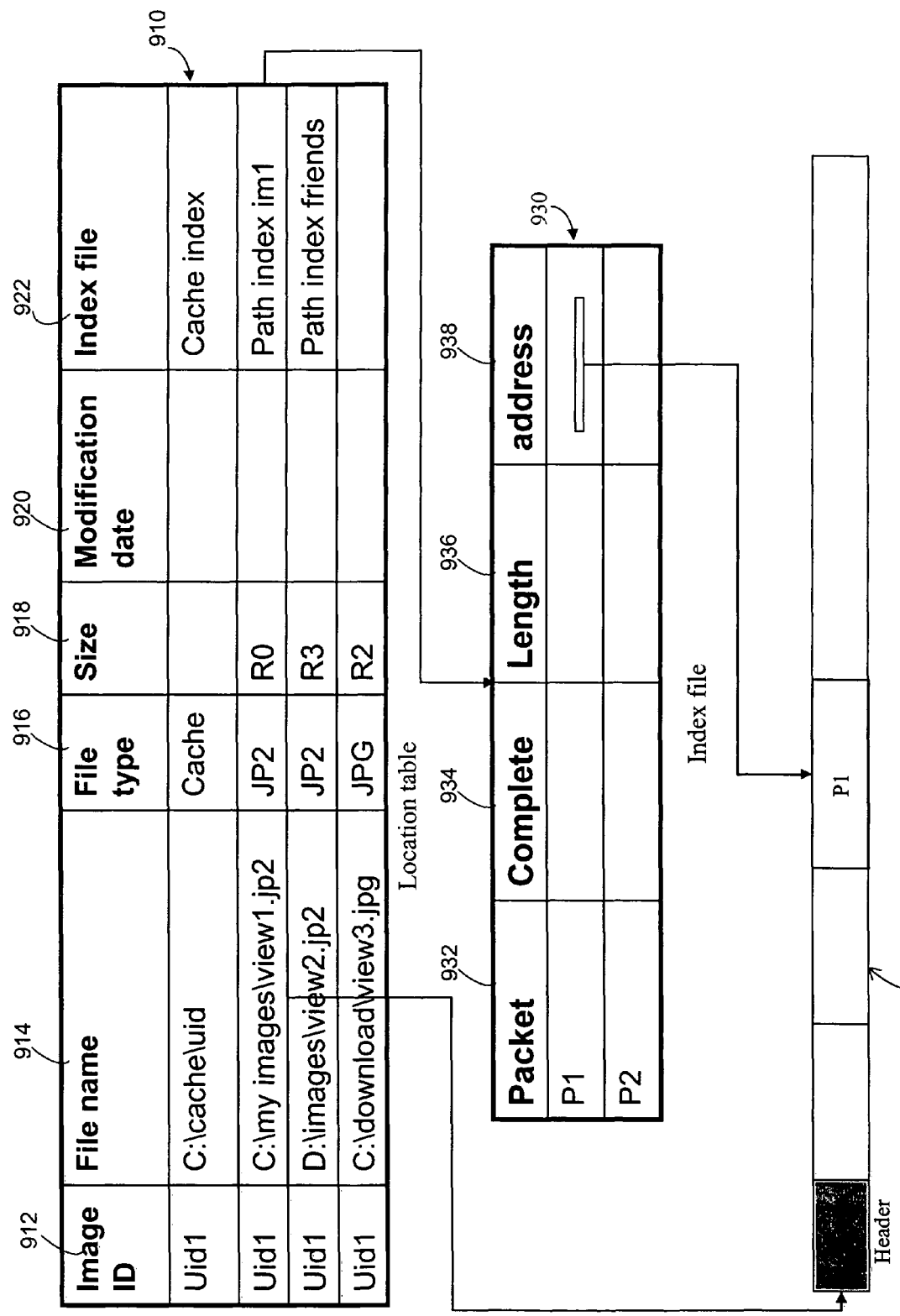
FIG. 8 represents data structures making it possible to find data, of an image signal, which a user wishes to access.

FIG. 8 illustrates data structures stored on a client apparatus making it possible easily and rapidly to find again all or part of the data constituting the original image signal.

Among those structures, table 910 represents the location table of the views which makes it possible to rapidly find again all the files associated with an image.

For each file stored in memory, the following information is possessed:

- the identifier of the image referenced 912 which is the unique identifier of the original image; the table is indexed according to that identifier to enable rapid access to all the views of a given image; that data structure thus establishes a link between each exploitable part of the signal and the unique identifier;
- the path of the file referenced 914 in the local file system; the cache file is found in a memory location managed by the application, but the views may be found in any folder depending on the choices of the user; more particularly, the data structure establishes a link between the unique identifier and the addresses of the locations in memory where the exploitable parts of the signal are stored;
- the type of file referenced 916 which makes it possible to know if the file contains data that are directly usable or not; in the example provided, the encoding format of the image for each view is indicated (JPEG2000 or JPEG) and a particular type for the cache file;
- the size indication referenced 918 which may be useful to more rapidly find the information sought; it may, for example, be the maximum resolution stored in the file or a file size;
- the modification date referenced 920 which makes it possible to rapidly verify that a file has not been modified and thus contains correct data;
- the path of the index file referenced 920 such as that named path index im1 and which is associated with a file containing exploitable information (view in a compatible format or cache file) and which is named C:\my images\view1.jp2; the index file represents the data present in the part of the signal contained in the described aforementioned file, for that part, of the sub-parts of data which here are data packets.

A data structure such as a table 930 constitutes the aforementioned index file and a descriptive map of the local data (data descriptor) of a view or of the cache file.

By way of a variant, the data 910 may also contain the signature of the file referenced 914. That signature may thus be used in step S4 of the algorithm of FIG. 9 to find the identifier of the image.

The data structure 910 establishes a link between each exploitable part of the signal, the unique identifier and an associated index file 930 and, in particular, its address in memory.

As shown by FIG. 8, it is possible to represent a descriptor of local data in which the data are organized linearly following a predetermined order.

It should be noted that this predetermined order may correspond to the initial order of the packets in the bitstream of the image signal conforming to the JPEG2000 standard, or else the packets may be reorganized as a function of criteria of efficiency of access to the data.

Thus, for example, when the image has been cut up into a plurality of spatial zones or tiles, it is useful to group together the packets P1, P2, P3 . . . Pn of data concerning each resolution of each tile and, for example, to include one after the other all the data packets corresponding to the lowest resolution level of each tile.

This makes it possible to easily reconstitute the low resolution version of an image and thus to respond easily to a request for obtaining this part of the signal.

In the example illustrated in FIG. 8, the packets are ordered in the order of progression tile-component-resolution-layer-precinct in a first field 932.

The descriptor of local data comprises a second field 934 which indicates whether the packet considered has been completely received or not.

In a following field denoted 936 the length of the complete packet is indicated.

It is appropriate to note that this length information may be received at the moment of the initialization of the data descriptor, or at the moment in which the first request concerning a data packet is transmitted, or else this information may accompany the packet to which it relates.

The local data descriptor comprises a final field 938 which provides the address in memory of the file 940 (C:\my images\view1.jp2) associated with the index file 930 of the packet (e.g.: P1) identified in the first field 932.

Thus, each index file identifies the sub-parts of data present in the part of the signal considered and their address in memory for them to be found again.

It should be noted that during a communication session the data packets are stored in a sequential manner in a temporary memory in their order of arrival: P1, P2, P3, etc.

However, at the end of a communication session, it is possible to arrange the packets in a different predetermined storage order in the file 940.

The aforementioned tables 910 and 930 could be organized differently, for example, by indexing first by packet and then, for each packet, by indicating the files which contain that packet. Such a structure would enable faster access to a packet searched for. However, the structure illustrated in FIG. 8 has the advantage of being able to easily make a name change, as well as the addition or the deletion of views.

The tables presented here may take the form of tables in a database. They may also be saved in the form of a plurality of files which may be retrieved on the basis of the image identifiers (for example, the file name may be based on the image identifier).

Figure 9:
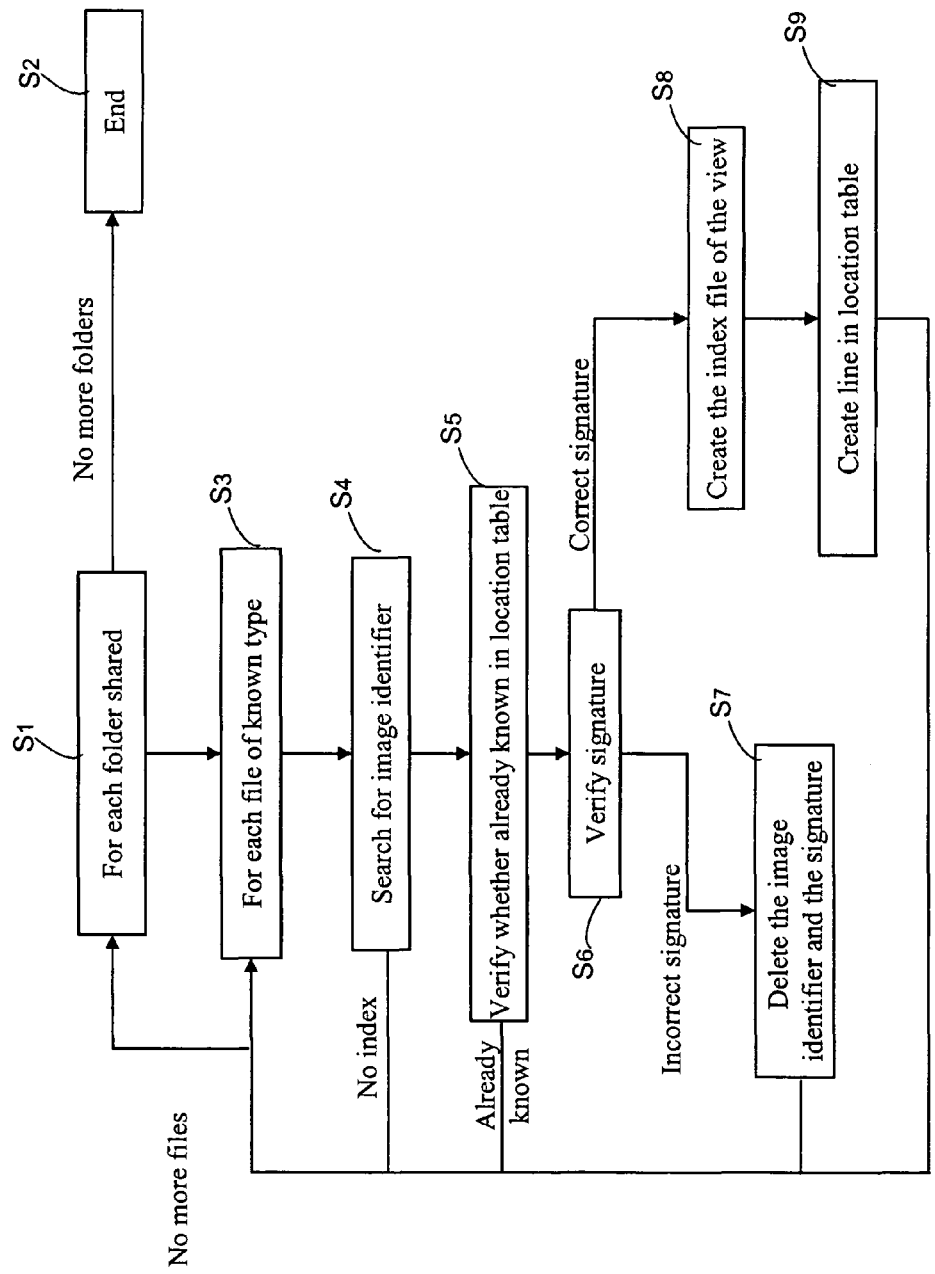
FIG. 9 represents an algorithm for searching for views in a client apparatus.

FIG. 9 represents an algorithm comprising different instructions or portions of code and which may be utilized to update the location table 910 of FIG. 8. A computer program "Prog 1", based on that algorithm and stored in the apparatus of FIG. 15, may be regularly executed, for example, every day, or when the sharing application starts up, or else when view files have disappeared.

The files containing exploitable parts of the signal (views) may be searched for by exploring, at step S1 of the algorithm, a set of folders which the user has indicated as being liable to contain shared files.

When all the folders in memory have been explored, the algorithm is terminated (step S2).

For each folder liable to contain shared files, the algorithm makes provision for exploring the image files of known type at step S3.

For each image file of known type, provision is made, during the following step S4, to verify whether the image file concerned contains the unique identifier of a shared image. The identifier may be contained in the image.

As a variant, it may be deduced from the content of the image using table 910: the signature of the image is calculated and the line with the signature is searched for in table 910. This line makes it possible to obtain the identifier of the image.

In the negative, step S4 is followed by step S3 already described in order to process another file.

In the affirmative, where the image file concerned contains the identifier of a shared image, the following step S5 makes provision for verifying whether the file considered is already known and thus listed in the location table 910 of FIG. 8 (file name 914).

Where the file associated with a unique image identifier is listed in table 910 of FIG. 8, step S5 is followed by S3 which makes provision for processing another file.

If the file considered is not listed in table 910, provision is made during the following step S6 to verify the signature of the latter.

During that step, it is determined whether the file considered has a content identical to that of a view already listed locally through the signature.

This is because the file may have been moved and renamed without modification of its content.

Should the signature be incorrect, the file can no longer be used and it is then necessary to remove the information contained in that file, such as the shared image identifier and the signature (step S7).

Step S7 is then followed by step S3 which has already been described above.

Where the signature of the file proves to be correct, it is then necessary to list that file in the location table 910 of FIG. 8 in order to establish a link between the exploitable part of the signal concerned and the unique identification of that signal, as with the index file 922 of table 910.

The image file concerned may be a new file with respect to shared image files previously received for the same image and already listed in a location table 910 such as that of FIG. 8.

However, in a more general case the image file concerned cannot be connected to an entry of the location table via the unique identifier, for example, where the user has directly received a file without using the sharing application (in case of reception by email for example).

During step S8, provision is made to analyze the content of that image file in order to determine in particular the type of file and its size.

This information may possibly be completed by other information which is saved in the headers of the image file and which specifies the features of the part of the signal (view) concerned with respect to the initial image signal (for example resolution and spatial position).

At this step, the associated index file 922 is also created on the basis of the analysis of the content of the image file and in particular on the basis of information found on the data packets received, such as those provided by the fields referenced 932, 934, 936 and 938. The associated index file Path index im1 930 may thus be created in the form of a table 930.

Step S9 is then executed in order to create a line in the location table 910 already created.

When step S9 is completed, the following step S3 is again executed to process a new file.

To be able to exchange the data of an image in a distributed network, it was mentioned with respect to FIG. 5 that it is necessary to exchange data descriptors indicating, for each communication apparatus of the network, the data which are present locally.

The descriptor relative to an apparatus contains the list of the packets available locally and this list may simply be constructed on the basis of the index files 922 of each view and of the cache file for a given image.

Figure 10:
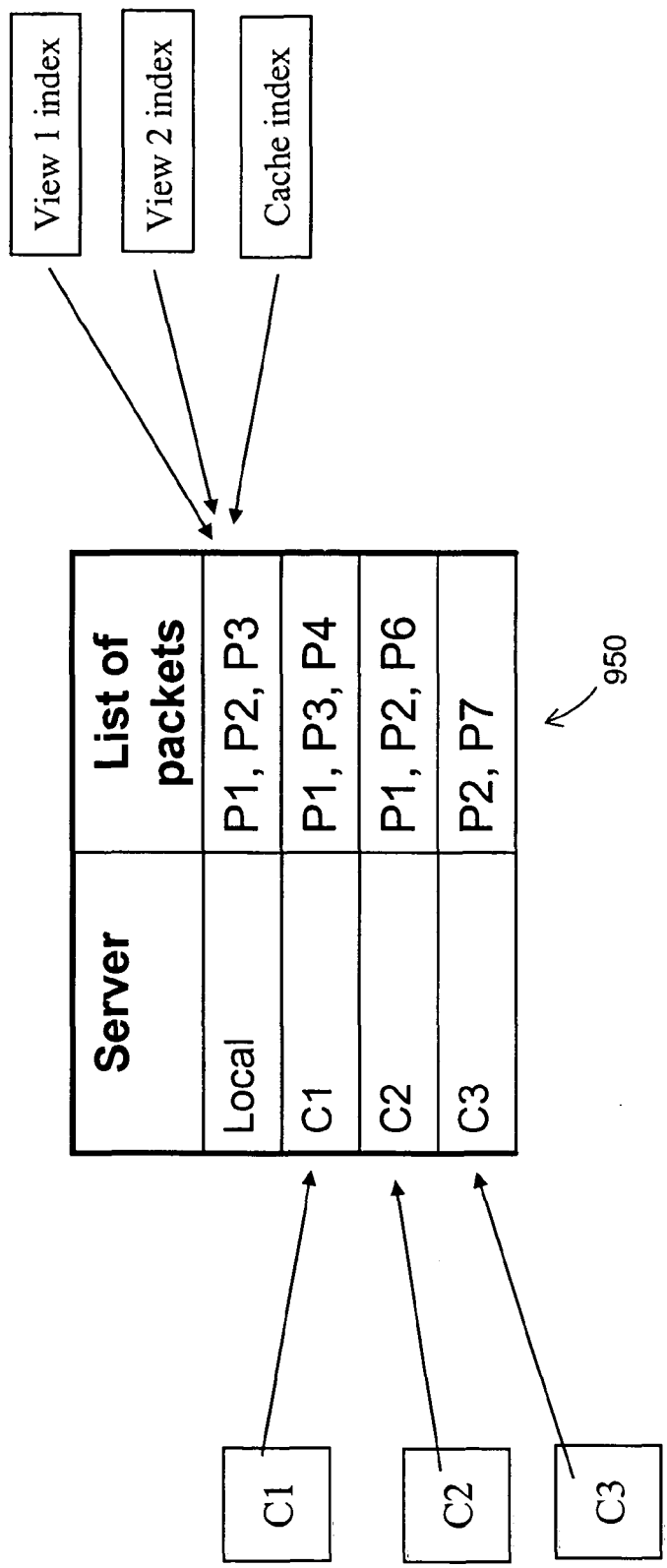
FIG. 10 represents a description table of an image shared between a plurality of apparatuses of the distributed network.

In the example illustrated in FIG. 10, the list of the packets present locally on an apparatus is produced by assembling together lists of complete packets present in the index files 922 of views 1 and 2 (the two views in a compatible format such as views 1 and 2 of FIG. 6) and in the index file of the cache. This list may then be transferred over the network to any client apparatus requesting information on the image.

In FIG. 10, it is considered that the apparatus (local server) is the client C4 which receives in this manner the descriptors describing the data available for the image sought on the available servers on the network, i.e. apparatuses C1, C2, C3. These data are then stored in a temporary memory, as long as operations are carried out on the image concerned.

Table 950 represented in FIG. 10 thus lists, for apparatus C4, the data descriptors relative to each apparatus C1, C2, C3 as well as the descriptor of apparatus C4.

Figure 11:
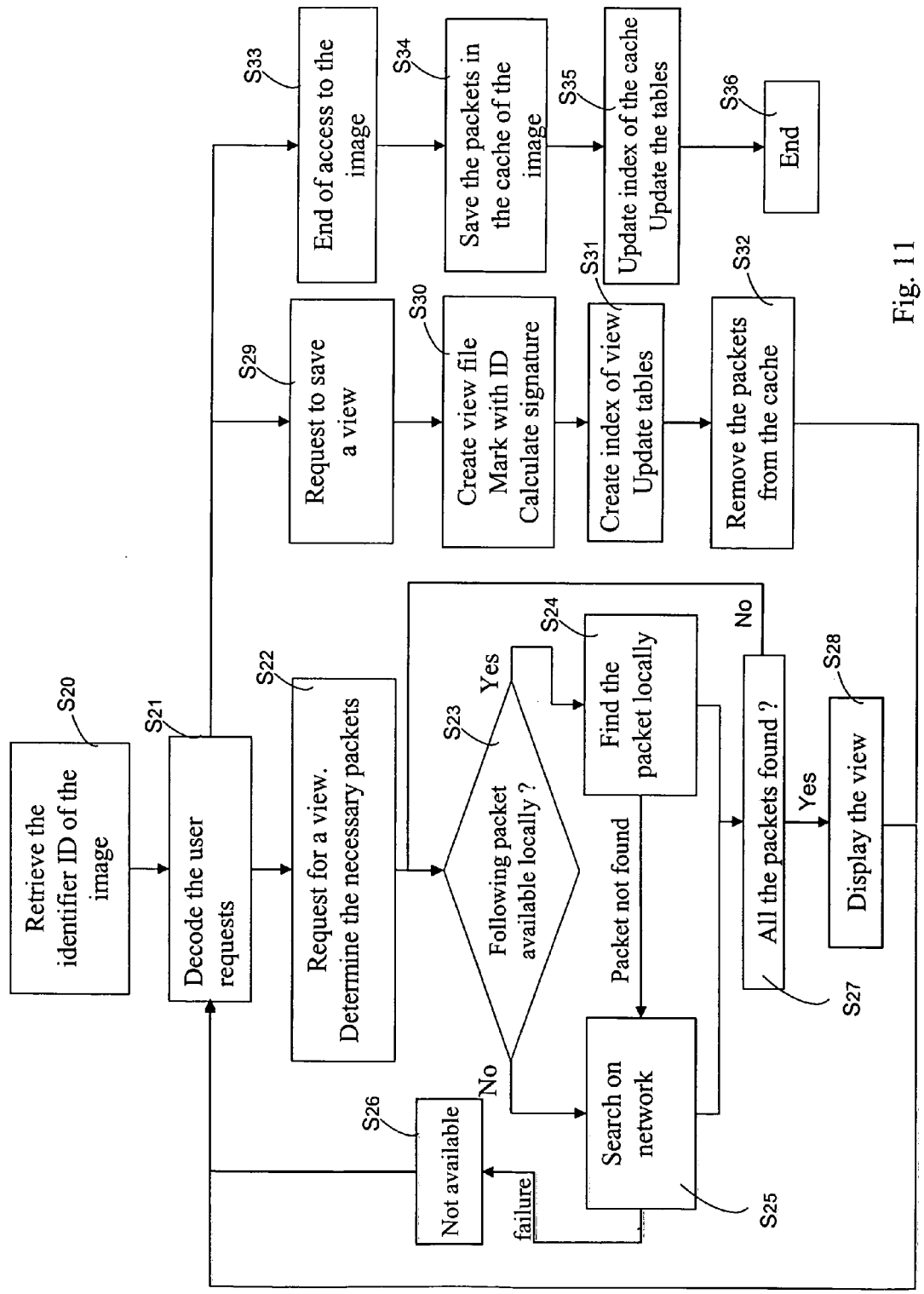
FIG. 11 is an algorithm for processing requests made by a user for accessing an image shared over a distributed network.

FIG. 11 represents an algorithm comprising different instructions or portions of code and which describes the steps performed when a user accesses an image shared in the distributed network.

A computer program denoted "Prog 2" and based on that algorithm is stored on the apparatus of FIG. 15.

The algorithm comprises a first step S20 which consists of finding the identifier of the image on the network. This identifier may be found, for example, in a view of the image, in an email (or another form of message) sent by another user (who may be the one who introduced the image into the network), or on a page in HTML format and which is available on the Internet.

On the basis of this identifier, the user will be able to produce a number of types of requests through commands available via a graphical interface.

The following step S21 thus consists of awaiting and decoding the user's requests.

One of the requests which may be formulated consists of viewing an exploitable portion of the image at a certain resolution: this is a request for accessing a view (step S22). The normal manner of accessing the image is to commence with accessing a thumbnail, then progressively increasing the resolution over all or a part of the image. Knowing the characteristics of the view requested (exploitable part of the signal), it is then possible to determine the data packets necessary for viewing that view.

By using table 950 of FIG. 10, it is possible, at step S23, to determine the packets which are available locally.

At the following step S24, those packets may then be retrieved from the cache memory or from the views by using the data structure of FIG. 8 and the algorithm of FIG. 13 which will be described later.

However, in the case in which the user has modified or destroyed certain views, the algorithm of FIG. 11 must restart a search in the distributed network, in the same manner as if the packet had never been downloaded to the client apparatus concerned and step S24 is then followed by step S25.

The search in the network which also takes place when the packet is not available locally (step S23) is performed using the table of FIG. 10 to find a server apparatus which has the packet searched for.

If no server apparatus recorded in the table has the packet, it is possible to extend the search, that is to say to search for other server apparatuses in the network which have the image (this is carried out using known techniques, such as a search of "Gnutella" type).

Next, each new server apparatus found is interrogated in order to retrieve its data descriptor for the image searched for.

The server apparatus and its descriptor are then added to the table of FIG. 10.

The apparatuses already recorded may also be interrogated again in order to determine whether a descriptor has been enriched by the addition of a packet since the last update.

If no apparatus present in the network has the packet searched for, then the request cannot be completed and the user is warned of the failure (step S26).

If a server apparatus has the packet searched for in its descriptor, a request is sent to it to ask for the packet to be transferred.

The algorithm of FIG. 12 which will be described later is used by the remote server apparatus to process the request concerning the packet asked for.

The same procedure is applied for all the packets searched for with the test carried out at step S27.

Where all the packets necessary for viewing the signal part considered (view) are found locally or by calling upon a remote server apparatus of the network which successfully transfers the missing packet or packets, the view may be reconstructed and displayed (step S28).

It will be noted that in the algorithm of FIG. 11 the packets received are stored but not in the cache file in contrast to what is illustrated in FIG. 6.

When the user has displayed a view of a shared image, he can again make various requests (step S21). The user may wish to display another view and his request will then be processed as described previously.

However, he may also request to save the view which he has just viewed to a file by selecting a memory location to store there the coherent part of the signal that is concerned (step S29).

When the user has chosen the name and the memory location of the file, the view is saved in the requested format (step S30). The identifier of the image is inserted in the view either in the form of a header, or in the form of a watermark. It may also be associated in a table with the signature of the image. The identifier inserted is the identifier of the image on the network. Similarly, the signature of the view is calculated and is introduced into the file of the view at step S30.

When the view is in a format usable to retrieve data packets, an associated index file 930 is also created and the location table 910, as well as the list of the packets present locally (descriptor of table 950 of FIG. 10) are updated (step S31).

At the following step S32, the packets which have been stored in the view may be deleted from the cache file if they were present there, which avoids unnecessary duplication of information.

At step S33 the user may also require termination of the viewing of the image, either to view another image, or to terminate the application in course.

In this case, it is necessary to save the packets received if they have not already been stored in the view files and these packets are then placed in the cache file of the image at step S34.

The index file 930 of the cache file is also updated, and the location table 910 as well as the list of packets present locally (descriptor of table 950 of FIG. 10) are updated (step S35).

The algorithm is next terminated at step S36.

Figure 12:
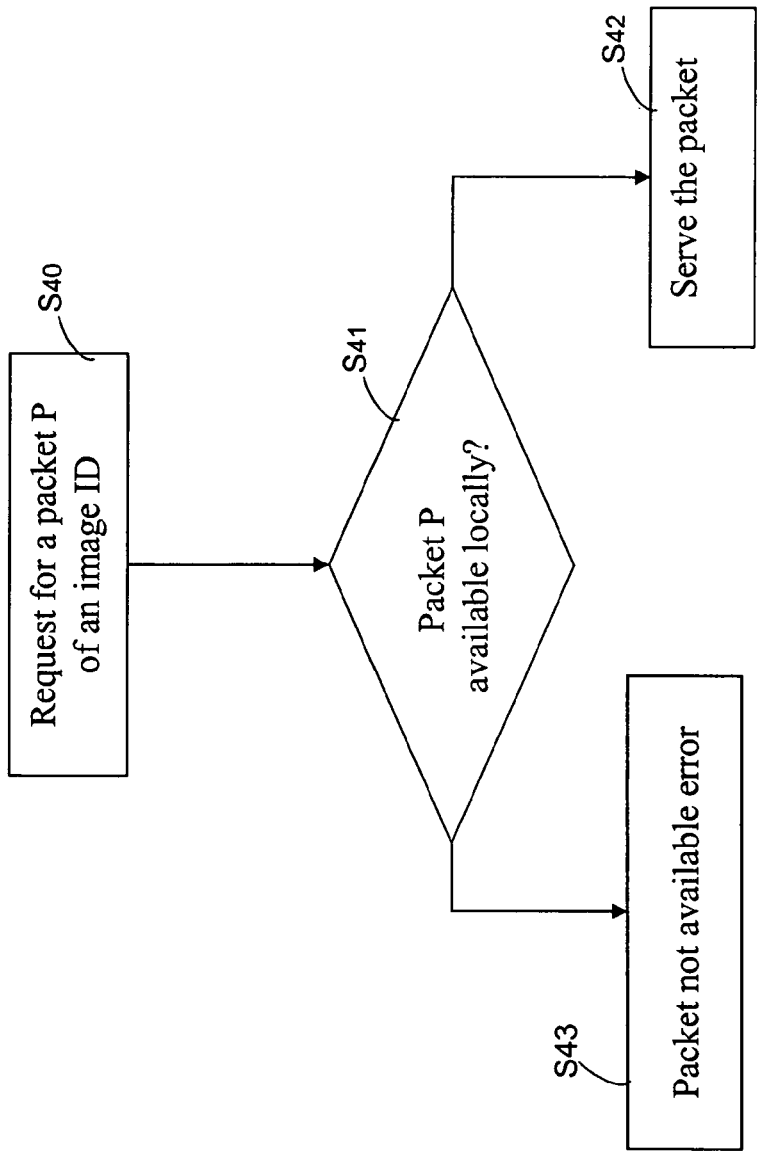
FIG. 12 is an algorithm for processing a request in a server apparatus of a distributed network.

When a remote server apparatus receives a request concerning a packet P of an image identified by its unique identifier ID, the algorithm of FIG. 12 is implemented in that apparatus to find the packet.

The algorithm comprises a first step S40 of receiving the request.

During the following step S41, a test is carried out in order to determine whether the packet is available locally. This search is carried out with the algorithm of FIG. 13 which will be described below.

If the packet is available locally, then it is served, that is to say it is transferred to the client apparatus from which the request came, at step S42.

If the packet is not available, on the contrary to the algorithm of FIG. 11, no other search is undertaken and an error message is transferred to the client apparatus at the origin of the request (step S43).

Figure 13:
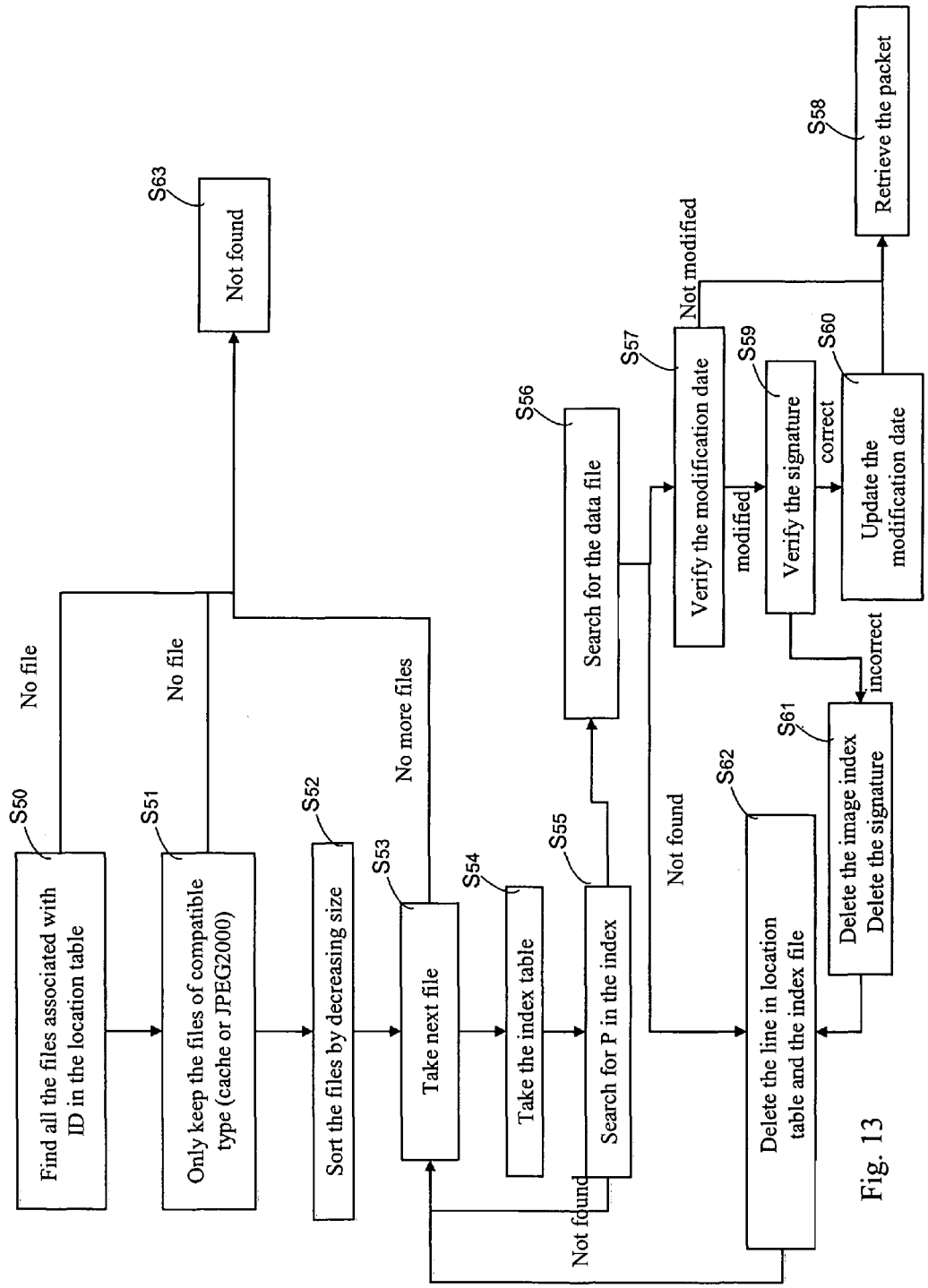
FIG. 13 is an algorithm for searching for a data packet implemented in a client apparatus of a distributed network.

FIG. 13 represents an algorithm for searching for a packet utilizing the data structure described with reference to FIG. 8.

A computer program "Prog 3" based on that algorithm is stored on the apparatus of FIG. 15.

This algorithm is invoked in the algorithm of FIG. 11, to access an image, and in that of FIG. 12, to process a request concerning a packet.

A packet is searched for with the unique identifier of the image ID and the characteristics of the packet (for example: tile, component, resolution, quality layer, precinct in the case of the JPEG2000 format).

The algorithm comprises a first step S50 which consists of searching in the location table 910 (FIG. 8) for all the files associated with the image ID.

Among these image files the only ones selected (step S51) are those of a type 916 enabling compatible packets to be retrieved, i.e., in the example considered, the JPEG2000 files and the cache.

These files are next sorted by decreasing size (step S52) in order to explore firstly those which contain the most information.

The following step S53 takes into account the first file of greatest size.

For this file, the algorithm next takes into account (step S54) the index table 930 of the associated index file 922 and performs a search (step S55) in order to determine whether the packet searched for is present.

If the packet is not found, then step S53 is passed on to in order to perform a search in the following file.

If the packet is present it is then necessary to verify that the file has not been modified, that is to say destroyed, moved or that its content has not been modified.

For this (step S56) the data file is sought containing the packet searched for.

If the file is found at the memory address which it should occupy, then the following step S57 makes provision for verifying whether it has been modified since the last verification by examining the possible dates of modification 920 of the file (FIG. 8).

If the file has not been modified, the packet is retrieved at step S58.

If the file has been modified, provision is made (step S59) for verifying the validity of the signature.

If the signature is valid, the date of modification noted at step S57 is updated (step S60) and the packet is retrieved (step S58).

If the signature is considered to be incorrect, the file cannot be utilized. This may occur if the user has edited the image, for example, by performing a rotation of the image, by removing red eye from a person or by changing the color balance.

The following step S61 then provides for deleting the identifications such as the shared image identification and the signature and for deleting the index file, as well as the information present in the corresponding line of the location table 910 (step S62).

Where the file is not found at the place indicated in the table (step S56), it has been destroyed or renamed and the algorithm merely destroys the corresponding line in the location table 910, as well as the index file (step S62). The previously described algorithm of FIG. 9 will deal with finding the file if it has been moved.

It will be noted that when steps S50, S51, S53 do not find any file, step S63 makes provision for warning the user with a "not found" message.

Figure 14:
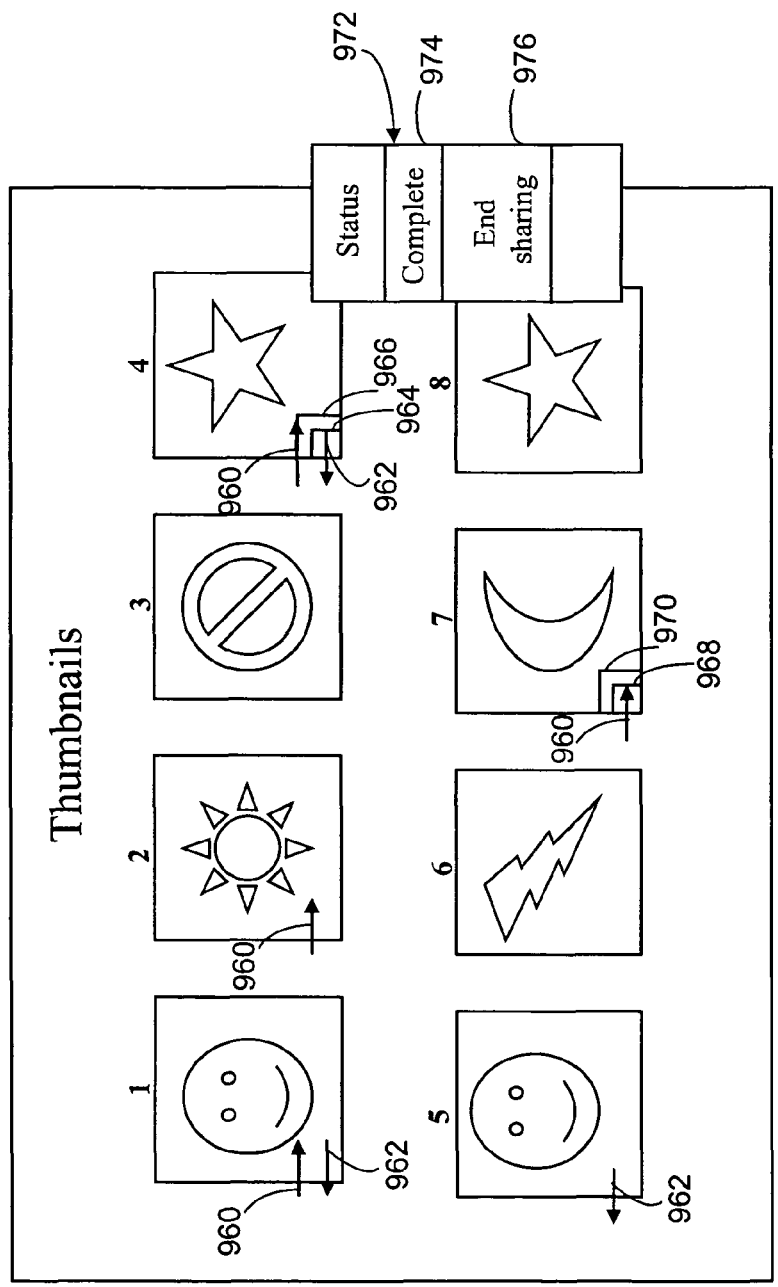
FIG. 14 is a diagram of a user interface.

FIG. 14 is a diagram of a user interface which may advantageously use the information available in the data structures described in FIGS. 8 and 10, as well as those which are contained in each file containing a view (coherent part of the stored signal), to display relevant information for the user.

This information is, for example, specific to each coherent part of the stored signal and is intended to inform the user of the state of the part considered.

Information on the state of the stored part of the signal inform the user more particularly on the availability of consecutive data of that part, whether on the client apparatus of the user or on one or a number of remote apparatuses of the network.

Information on the state of the stored part of the signal also informs the user as to the possibility of sharing that part of the signal with one or a number of other communication apparatuses.

When the user views one or a number of local files in icon or preview form, the image displayed may be modified to take into account the state of the data viewed.

In the example of FIG. 14, a number of indicators are superposed over the icons of the thumbnails 1 to 8 to give a number of items of information:

A reception arrow referenced 960 appears on thumbnails 1, 2, 4 and 7 and indicates that the image considered which has been stored in memory on the apparatus is a view of a shared image, the data having been received from the network.

A sending arrow referenced 962 appears on thumbnails 1, 4 and 5 and indicates that the data of the view are usable for sharing the image on the network with other apparatuses. This is the case for a view which is in a format compatible with the format of exchange on the network or for the original image.

A number of rectangles referenced 964, 966, 968 and 970 appearing on thumbnails 4 and 7 indicate that the file is a partial view of an image, all the data making up the original image not being in the view stored on the apparatus.

By combining these indicators, it is possible to deduce a large amount of information with ease:

An image is not shared (thumbnails 3, 6 and 8).
An image is an original shared image (thumbnail 5).
An image is a partial view of a shared image (thumbnail 4).
An image is a partial view in a format not usable for the network (thumbnail 7).
An image is a complete view (thumbnail 1).
An image is a complete view in a format not usable for the network (thumbnail 2).

Other indicators, such as colors, could represent other useful information, such as the fact that supplementary data is available for a partial view, it being possible for this data to come from the local cached file or other views stored locally, or to come from the distributed network. This supplementary information is, for example, extracted from the description table of FIG. 10.

The user interface also comprises commands enabling a user to carry out various operations specific to the sharing of a view.

The commands associated with the views may vary as a function of the state of the view.

Thus, the commands provided for the user make it possible to perform the following operations:

"Complete" an image for a partial view, which may correspond to going to find an additional resolution for a view which only contains a low resolution of the image; the more complete image may be viewed or simply be saved and replace the chosen file.

"Share" in order to share an unshared image.

"End sharing" for an image already shared.

"Display more information": trace of network accesses, associated rights of access, state of the image on the network, etc.

For example, the vertical command bar 972 displayed for thumbnail 4 enables the user to choose between the functions "Complete" 974 and "End sharing" 976.

It will be noted that the state or the status of a view may in particular be dictated by the fact that:

the view has been modified,
the format of the view prevents it from being shared,
the user does not wish to share the view.

A particular embodiment of the invention may take the form of a plug-in for an exising application, such as a file explorer (e.g. Microsoft Explorer). The plug-in may thus modify the display of the icons and of the thumbnails when the user browses his files.

Renamings of files which take place in the application may thus be detected directly at the moment the user does the operation, which makes it possible to update the location table directly at the moment that a file is renamed, moved or destroyed, without needing the algorithm of FIG. 9. This algorithm must however be put in place since operations may occur in other applications.

With reference to FIG. 15 an example of a programmable communication apparatus implementing the invention is described.

Each of the communication apparatuses of FIGS. 1 and 5 is, for example, identical to the apparatus of FIG. 15.

More particularly, within a distributed network, each apparatus connected is liable to implement the invention and thus possesses the means making it adapted to that implementation.

The apparatus of FIG. 15 comprises the device according to the invention.

According to the chosen embodiment shown in FIG. 15, an apparatus implementing the invention is for example a microcomputer 1200 or a workstation connected to different peripherals, for example a digital moving image camera 1201 (or a scanner, or any means of acquiring or storing an image) connected to a graphics card and supplying multimedia data to the apparatus.

The apparatus 1200 comprises a communication bus 1202 to which there are connected:

a central processing unit 1203 (microprocessor),
a read only memory 1204, able to contain the programs "Prog1", "Prog2" and "Prog3",
a random access memory 1206, comprising registers adapted to record variables and parameters created and modified during the execution of the aforementioned programs, as well as the data descriptors and the data packets processed during the execution of those programs, a screen 1208 for displaying data (exploitable parts of the signal) and/or for serving as a graphical interface with the user, who will be able to interact with the programs according to the invention, using a keyboard 1210 or any other means such as a pointing device, for example a mouse 1211 or an optical stylus, a hard disk 1212 able to hold the aforementioned programs "Prog1", "Prog2", and "Prog3", as well as the cache file and the view files, a floppy disk drive 1214 adapted to receive a diskette 1216 and to read or write thereon data processed or to be processed according to the invention, a communication interface 1218 connected to a distributed communication network 1220, for example the Internet, the interface being able to transmit and receive data.

In the case of audio data, the apparatus further comprises an input/output card (not shown) connected to a microphone 1222.

The communication bus allows communication and interoperability between the different elements included in the microcomputer 1200 or connected to it. The representation of the bus is non-limiting and, in particular, the central processing unit is able to communicate instructions to any element of the microcomputer 1200 directly or by means of another element of the microcomputer 1200.

The executable code of each program enabling the programmable apparatus to implement the algorithms of FIGS. 9, 11, 12 and 13 according to the invention may be stored, for example, on the hard disk 1212 or in read-only memory 1204 as shown in FIG. 15.

According to a variant, the diskette 1216 can contain data as well as the executable code of the aforementioned programs which, once read by the apparatus 1200, will be stored on the hard disk 1212.

As a second variant, the executable code of the programs can be received by the intermediary of the communication network 1220, via the interface 1218, in order to be stored in an identical fashion to that described previously.

The diskettes can be replaced by any information carrier such as a compact disc (CD-ROM) or a memory card. Generally, an information storage means, which can be read by a computer or microprocessor, integrated or not into the apparatus, and which may possibly be removable, is adapted to store one or more programs whose execution permits the implementation of the method according to the invention.

More generally, the program or programs may be loaded into one of the storage means of the apparatus 1200 before being executed.

The central processing unit 1203 will control and direct the execution of the instructions or portions of software code of the program or programs according to the invention, these instructions being stored on the hard disk 1212 or in the read-only memory 204 or in the other aforementioned storage elements. On powering up, the program or programs which are stored in a non-volatile memory, for example the hard disk 1212 or the read-only memory 1204, are transferred into the random-access memory 1206 (RAM), which will then contain the executable code of the program or programs according to the invention, as well as registers for storing the variables and parameters necessary for implementation of the invention.

It should be noted that the communication apparatus comprising the device according to the invention can also be a programmed apparatus.

This apparatus then contains the code of the computer program or programs for example fixed in an application specific integrated circuit (ASIC).

The invention claimed is:

1. A method of processing digital data constituting a signal in a distributed communication network comprising a plurality of communication apparatuses, the signal being identified by a unique identifier (ID), wherein the method comprises the following steps:

storing in a first cache memory location of a communication apparatus the signal;

storing in one or more second memory locations of the communication apparatus distinct from the first cache memory location one or more exploitable parts of the signal in a format readable by an application, so that each exploitable part of the signal is directly exploitable by a user, wherein at least one of said exploitable parts of the signal comprises less than the entirety of the signal, and wherein the one or more second memory locations are chosen by the user and the exploitable part of the signal is stored at an arbitrary address of the second memory location chosen by the user;

associating the unique identifier of the signal with each respective stored exploitable part of the signal stored in the one or more second memory locations; and storing in at least one communication apparatus a data structure establishing a link between each respective exploitable part of the signal stored in the one or more second memory locations and the unique identifier of the signal stored in the first cache memory location, wherein the data structure also establishes a link between each exploitable part of the signal and an index representing the data present in the part considered, and the method further comprises the following steps performed by the communication apparatus or apparatuses in which the one or more exploitable parts of the signal are stored;

a prior reception of at least some data constituting the signal stored in the first cache memory; and managing, after the prior reception, memory locations, wherein data received that is stored in the first cache memory location, which are determined to be contained in the exploitable part or parts of the signal stored respectively in the one or more second memory locations chosen by the user, are deleted from the first cache memory location in a case where the data received and the exploitable part or parts are in the same format, or in a case where the data received and the exploitable part or parts are not in the same format but can be passed from the format of the exploitable part or parts to the format of the data received without a loss of information.

2. A method according to claim 1, wherein the data structure takes the form of a location table for all the exploitable parts of the signal having the same unique identifier of the signal.

3. A method according to claim 1, wherein the data structure also establishes a link between the unique identifier of the signal and the addresses in memory of the one or more second memory locations where the different exploitable parts of the signal are stored.

4. A method according to claim 1, wherein, for each exploitable part of the signal, the index describes sub-parts of data constituting the part considered.

5. A method according to claim 1, wherein the data structure establishes a link between the unique identifier of the signal and the addresses in memory of the indices of the different exploitable parts of the signal.

6. A method according to claim 1, wherein each index specific to a given exploitable part of the signal corresponds to a data structure in table form comprising an identification of the data present in the part considered and respective addresses in memory enabling such data to be retrieved in said part stored in memory in the one or more second memory locations.

7. A method according to claim 1, further comprising a step of selecting at least one format in which each exploitable part of the signal is stored.

8. A method according to claim 1, further comprising a step of transferring over the network sub-parts of data constituting at least one exploitable part of the signal.

9. A method according to claim 8, wherein the step of associating the unique identifier of the signal with an exploitable part of the signal is performed by the communication apparatus or apparatuses receiving all or part of the data constituting that part.

10. A method according to claim 1, wherein the step of associating the unique identifier of the signal corresponds to a step of inserting that identifier in an exploitable part of the signal.

11. A method according to claim 10, wherein the unique identifier is either inserted in a header of the exploitable parts of the signal or in the content of the exploitable parts of the signal.

12. A method according to claim 1, wherein the step of storing the data structure in memory is performed by the communication apparatus or apparatuses receiving all or part of the data constituting an exploitable part of the signal.

13. A method according to claim 1, further comprising a step of obtaining, by at least one communication apparatus receiving all or part of the data constituting an exploitable part of the signal, at least one data descriptor representing the data present on one or more other communication apparatuses of the network.

14. A method according to claim 1, further comprising a step, performed on a communication apparatus on which one or more exploitable parts of the signal are stored, of viewing all or part of each exploitable part of the stored signal.

15. A method according to claim 1, further comprising a step, performed on a communication apparatus on which one or more exploitable parts of the signal are stored, of viewing information specific to each stored part and adapted to inform a user of the state of the part considered.

16. A method according to claim 15, wherein the state of the exploitable signal part considered represents the availability of other data constituting the signal.

17. A method according to claim 15, wherein the state of the exploitable signal part considered represents the possibility of sharing that part with one or more other communication apparatuses.

18. A method according to one of claims 15 to 17, wherein the information specific to each stored part is in particular obtained from the stored data structure.

19. A method according to claim 1, further comprising a step, performed on a communication apparatus on which one or more exploitable parts of the signal are stored, of viewing commands enabling a user, on the basis of an exploitable part of the signal stored in memory in the one or more second memory locations, of performing different operations specific to the sharing of the part considered with one or more other communication apparatuses, to complete the part considered with supplementary data or to share the part considered with one or more other communication apparatuses.

20. A method according to claim 1, further comprising a prior step of generating the unique identifier of the signal.

21. A method according to claim 20, wherein the step of generating the unique identifier of the signal is performed by the communication apparatus transferring all or part of the data constituting an exploitable part of the signal to one or more other communication apparatuses.

22. A method according to claim 1, wherein the digital signal is an image signal.

23. An non-transitory information storage means which can be read by a computer or a microprocessor containing computer-executable code instructions of a computer program for executing the steps of the method according to claim 1.

24. A method according to claim 1, wherein a signature calculated from the exploitable parts of the signal is associated with the identifier in a table.

25. A method according to claim 1, wherein the arbitrary address of a memory location is provided by a user.

26. A device for processing digital data constituting a signal in a distributed communication network comprising a plurality of communication apparatuses, the signal being identified by a unique identifier (ID), wherein the device comprises:
    means for storing in a first cache memory location of a communication apparatus the signal and for storing in one or more second memory locations of the communication apparatus distinct from the first cache memory location one or more exploitable parts of the signal in a format readable by an application, so that each exploitable part of the signal is directly exploitable by a user, wherein at least one of said exploitable parts of the signal comprises less than the entirety of the signal, wherein the one or more second memory locations are chosen by the user and the exploitable part of the signal is stored at an arbitrary address of the second memory location chosen by the user;
    means for associating the unique identifier of the signal with each respective stored exploitable part of the signal stored in the one or more second memory locations;
    means for storing in at least one communication apparatus a data structure establishing a link between each respective exploitable part of the signal stored in the one or more second memory locations and the unique identifier of the signal stored in the first cache memory location, wherein the data structure also establishes a link between each exploitable part of the signal and an index representing the data present in the part considered;
    and further comprising in the communication apparatus or apparatuses in which the one or more exploitable parts of the signal are stored;
    means for a prior reception of at least some data constituting the signal stored in the first cache memory; and
    means for managing, after the prior reception, memory locations, wherein data received that is stored in the first cache memory location, which are determined to be contained in the exploitable part or parts of the signal stored respectively in the one or more second memory locations chosen by the user, are deleted from the first cache memory location in a case where the data received and the exploitable part or parts are in the same format, or in a case where the data received and the exploitable part or parts are not in the same format but can be passed from the format of the exploitable part or parts to the format of the data received without a loss of information.

27. A device according to claim 26, wherein the data structure takes the form of a location table for all the exploitable parts of the signal having the same unique identifier of the signal.

28. A device according to claim 26, further comprising means for selecting at least one format in which each exploitable part of the signal is stored.

29. A device according to claim 26, further comprising means for transferring over the network the sub-parts of data constituting at least one exploitable part of the signal.

30. A device according to claim 26, further comprising means for viewing all or part of each exploitable part of the signal stored on a communication apparatus, said means forming part of a communication apparatus in which one or more exploitable parts of the signal are stored.

31. A device according to claim 26, further comprising means for viewing information specific to each stored part and adapted to inform a user of the state of the part considered, said means forming part of a communication apparatus on which one or more exploitable parts of the signal are stored.

32. A device according to claim 31, wherein the state of the exploitable signal part considered represents the availability of other data constituting the signal.

33. A device according to claim 31, wherein the state of the exploitable signal part considered represents the possibility of sharing that part with one or more other communication apparatuses.

34. A device according to claim 26 further comprising means for viewing commands enabling a user, on the basis of an exploitable part of the signal stored in memory in the one or more second memory locations, to perform different operations specific to the sharing of the part considered with one or more other communication apparatuses, to complete the part considered with supplementary data or to share the part considered with one or more other communication apparatuses, said means forming part of a communication apparatus on which one or more exploitable parts of the signal are stored.

35. A device according to claim 26, further comprising means for generating the unique identifier of the signal.

36. A communication apparatus comprising:
a device according to claim 26
storage means for storing the exploitable parts; and
an interface to the communication network.

37. A device according to claim 26, wherein the unique identifier is either inserted in a header of the exploitable parts of the signal or in the content of the exploitable parts of the signal.

38. A device according to claim 26, wherein a signature calculated from the exploitable parts of the signal is associated with the identifier in a table.

39. A device according to claim 26, wherein the arbitrary address of a memory location is provided by a user.

* * * * *